US012538883B2

United States Patent
Lee et al.

(10) Patent No.: US 12,538,883 B2
(45) Date of Patent: Feb. 3, 2026

(54) PLANT CULTIVATOR

(71) Applicant: LG ELECTRONICS INC., Seoul (KR)

(72) Inventors: Soobeom Lee, Seoul (KR); Seok Man Kang, Seoul (KR); Youn Ho Jeong, Seoul (KR); Sangpyo Hong, Seoul (KR); Jaewoong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/688,217

(22) PCT Filed: Aug. 30, 2022

(86) PCT No.: PCT/KR2022/012952
§ 371 (c)(1),
(2) Date: Feb. 29, 2024

(87) PCT Pub. No.: WO2023/033513
PCT Pub. Date: Mar. 9, 2023

(65) Prior Publication Data
US 2024/0373800 A1    Nov. 14, 2024

(30) Foreign Application Priority Data

Aug. 30, 2021 (KR) .................. 10-2021-0115139
Dec. 27, 2021 (KR) .................. 10-2021-0189063

(51) Int. Cl.
*A01G 31/02* (2006.01)
*A01G 27/02* (2006.01)

(52) U.S. Cl.
CPC ............. *A01G 31/02* (2013.01); *A01G 27/02* (2013.01)

(58) Field of Classification Search
CPC .... A01G 31/02; A01G 31/008; A01G 31/011; A01G 31/021; A01G 9/047;
(Continued)

(56) References Cited

U.S. PATENT DOCUMENTS

2018/0288950 A1    10/2018  Ogata et al.
2020/0260669 A1*    8/2020  Kim ....................... A01G 7/045

FOREIGN PATENT DOCUMENTS

CN    205848244    1/2017
CN    107072159    8/2017
(Continued)

OTHER PUBLICATIONS

KR-20190064058-A Translation (Year: 2019).*
(Continued)

*Primary Examiner* — Kimberly S Berona
*Assistant Examiner* — Steven J Shur
(74) *Attorney, Agent, or Firm* — KED & ASSOCIATES, LLP

(57) ABSTRACT

The present disclosure relates to a plant cultivator that can significantly improve user convenience by significantly simplifying the disassembly and assembly processes for cleaning and holding a main body part, a water tank part, and a cultivation port part and can significantly improve the efficiency and productivity of plant cultivation by applying a cultivation port part compatible with a closed type cultivator capable of mass cultivation.

19 Claims, 28 Drawing Sheets

(58) Field of Classification Search
CPC .............. A01G 31/024; A01G 31/0232; A01G 31/023; A01G 31/025; A01G 31/0231; A01G 31/022; A01G 27/06; A01G 27/02
See application file for complete search history.

(56) References Cited

FOREIGN PATENT DOCUMENTS

| EP | 3785526 | 3/2021 | |
|----|---------|--------|---|
| JP | 2014-000023 | 1/2014 | |
| JP | 2017-063646 | 4/2017 | |
| KR | 10-2012-0080373 | 7/2012 | |
| KR | 10-1435568 | 8/2014 | |
| KR | 101435568 B1 * | 8/2014 | ............ A01G 27/06 |
| KR | 10-2019-0028218 | 3/2019 | |
| KR | 20190028218 A * | 3/2019 | ............ A01G 31/06 |
| KR | 10-2019-0064058 | 6/2019 | |
| KR | 20190064058 A * | 6/2019 | ............... A01C 3/02 |
| KR | 10-2198413 | 1/2021 | |
| WO | WO 2015 /025409 | 2/2015 | |

OTHER PUBLICATIONS

KR-101435568-B1 Translation (Year: 2014).*
KR-20190028218-A Translation (Year: 2019).*
International Search Report (with English Translation) dated Dec. 15, 2022 issued in Application No. PCT/KR2022/012952.
Korean Office Action dated Oct. 8, 2024 issued in Application No. 10-2021-0189063.
Extended European Search Report dated Sep. 9, 2025 issued in Application No. 22865015.6.

* cited by examiner

PLANT CULTIVATOR

CROSS-REFERENCE TO RELATED PATENT APPLICATIONS

This application is a U.S. National Stage Application under 35 U.S.C. § 371 of PCT Application No. PCT/KR2022/012952, filed Aug. 30, 2022, which claims priority to Korean Patent Application Nos. 10-2021-0115139, filed Aug. 30, 2021, and 10-2021-0189063, filed Dec. 27, 2021, whose entire disclosures are hereby incorporated by reference.

TECHNICAL FIELD

The present disclosure relates to a plant cultivator, and more specifically, to a plant cultivator that can significantly improve user convenience by significantly simplifying the disassembly and assembly processes for cleaning and holding a main body part, a water tank part, and a cultivation port part and can significantly improve the efficiency and productivity of plant cultivation by applying a cultivation port part compatible with a closed type cultivator capable of mass cultivation.

BACKGROUND ART

Recently, consumer interest in and demand for eco-friendly crops have been rapidly increasing.

In order to meet the interest and demand of such users, technologies and products related to home plant cultivators that can easily directly cultivate plants such as vegetables at home are being developed.

In general, the way to grow plants at home is to fill a container such as an open-top pot with culture soil, plant various seeds or plants in the culture soil, and supply moisture at regular intervals to provide the environment necessary for cultivating the plant (lighting, ventilation, and the like).

However, not only is it very cumbersome to create an environment for cultivating plants using the culture soil at home, but it is also not easy to obtain suitable culture soil.

As an alternative to the traditional cultivation method using such culture soil, the proportion of plant cultivators applying the hydroponic cultivation method using culture water mixed with water and culture medium in a certain ratio suitable for home use is gradually increasing.

In general, the home plant cultivators using the hydroponic cultivation method can be divided into a closed type, in which the cultivation environment in which plants are cultivated is formed as a closed room inside the cultivation room, and an open type, in which the cultivation environment is exposed to indoors as it is.

Regarding an open plant cultivator, in Japanese Patent Laid-Open No. 2014-000023 (Prior Document 001), the configuration of a plant cultivator is disclosed which includes a hydroponic cultivation unit, a base part supporting the hydroponic cultivation unit, and a lighting part that emits light to the hydroponic cultivation unit.

Here, the hydroponic cultivation unit is equipped with a medium suitable for hydroponic cultivation of plants and corresponds to a configuration referred to as a cultivation pod or a cultivation pot in the related technical field.

However, in the plant cultivator disclosed in prior document 001, the each components that perform each function are not modularized, resulting in the problem that disassembly and assembly work for periodic cleaning are very cumbersome.

In addition, the hydroponic cultivation unit of prior document 001, which corresponds to a cultivation pod or a cultivation port, is capable of cultivating only a very small amount of plants and is configured to be incompatible with a closed type plant cultivator capable of relatively large-scale cultivation. Therefore, there is a problem that the efficiency and productivity of plant cultivation are very low.

In addition, the main body part of prior document 001 stores culture water containing a culture medium, but the main body part is made of a material with a very high light transmittance. Therefore, since the culture medium is directly exposed to the light of the lighting, there is a problem that the inside of the main body part inevitably becomes a very favorable environment for the growth of moss, and the inside of the main body part is very likely to be contaminated by moss.

DISCLOSURE

Technical Problem

The present disclosure was conceived to solve the problems of the prior art described above, and an first object of the present disclosure is to provide a plant cultivator that can significantly improve user convenience by significantly simplifying the disassembly and assembly processes for cleaning and holding a main body part, a water tank part, and a cultivation port part, which constitute the plant cultivator.

In addition, a second object of the present disclosure is to provide a plant cultivator that can significantly improve the efficiency and productivity of plant cultivation by applying a cultivation port part compatible with a closed type cultivator capable of mass cultivation.

In addition, a third object of the present disclosure is to provide a plant cultivator that can minimize the possibility that the cultivation water stored inside the water tank part may be exposed to light and minimize the possibility of moss growth by being at least partially made of an opaque plastic material that minimizes light transmission through the water tank part where the culture water is stored and the cultivation port part mounted on the water tank part.

In addition, the fourth object of the present disclosure is to provide a plant cultivator in which the cultivation water does not rush sharply to one side even if the volume of the water tank part is large, and the cultivation water does not easily overflow even if the water tank part is sharply tilted.

The objects of the present disclosure are not limited to the objects mentioned above, and other objects and advantages of the present disclosure that are not mentioned can be understood by the following description and will be more clearly understood by the embodiments of the present disclosure. Additionally, it will be readily apparent that the objects and advantages of the present disclosure can be realized by the means and combinations thereof indicated in the patent claims.

Technical Solution

A plant cultivator according to the present disclosure includes a cultivation port part; a water tank part on which the cultivation port part is mounted and which stores cultivation water to be supplied to the cultivation port part; a main body part to which the water tank part is detachably coupled; and a light source part configured to emit light toward the cultivation port part, in which the water tank part is coupled to the main body part in a non-fastening manner.

In addition, a guide rib may be provided at a lower portion of the water tank part to determine a position at which the water tank part is coupled to the main body part.

In addition, in a state where the water tank part is coupled to the main body part, the guide rib may allow relative movement of the water tank part in an upward direction with respect to the main body part, but restrict relative movement in the front and rear direction.

In addition, the water tank part may include a water tank body whose upper surface is entirely open and in which a storage space for the cultivation water is formed; and in which the guide rib may be formed to protrude from a bottom surface of the water tank body toward the main body part.

In addition, the guide rib may be formed integrally with the bottom surface of the water tank body.

In addition, the protruding height and thickness from the bottom surface of the water tank body of the guide rib may be constant throughout entire part of the guide rib.

In addition, a width of the guide rib in a front and rear direction may be formed to be smaller than a width in a left and right direction.

In addition, the main body part may have an engaging groove part into which the guide rib is entirely inserted while the water tank part is coupled, and the engaging groove part may restrict relative movement of the guide rib in the front and rear direction.

In addition, the plant cultivator may further include a housing disposed above the main body and configured to accommodate the light source part; and at least one spacer whose one end portion is detachably coupled to the housing and whose other end portion is detachably coupled to the main body part; in which a storage space in which the at least one spacer separated from the housing and the main body part is configured to be accommodated may be formed inside the engaging groove part.

In addition, the water tank part may include a water tank body whose upper surface is entirely open and in which a storage space for the cultivation water is formed; and a water tank cover detachably coupled to the water tank body and configured to at least partially cover the open upper surface of the water tank body; in which the water tank cover may be disposed on an upper side of the water tank body and may have a mounting surface configured to at least partially cover the open upper surface of the water tank body, and the cultivation port part may be seated on the mounting surface in a non-fastening manner.

In addition, the water tank body and the water tank cover may be made of an opaque material.

In addition, the mounting surface may have an insertion hole which is open toward the storage space of the water tank body and through which a lower end of the cultivation port part passes, and an area of the insertion hole may be smaller than an area of the open upper surface of the water tank body.

In addition, the area of the insertion hole may be smaller than a cross-sectional area of an upper end of the cultivation port part.

In addition, the insertion hole may be covered by the upper end of the cultivation port part.

In addition, the mounting surface may have a cultivation water supply groove which is in communication with the insertion hole and formed on a lower side of the upper end of the cultivation port part.

Advantageous Effect

The plant cultivator according to the present disclosure has the effect of significantly improving user convenience by significantly simplifying the disassembly and assembly processes for cleaning and holding the main body part, water tank part, and cultivation port parts that constitute the plant cultivator.

In addition, the plant cultivator according to the present disclosure has the effect of significantly improving the efficiency and productivity of plant cultivation by applying a cultivation port part that is compatible with a closed type cultivator capable of mass cultivation.

In addition, the plant cultivator according to the present disclosure has the effect of being capable of minimizing the possibility that the cultivation water stored inside the water tank part may be exposed to light and minimizing the possibility of moss growth by being at least partially made of an opaque plastic material that minimizes light transmission through the water tank part where the culture water is stored and the cultivation port part mounted on the water tank part.

In addition, the plant cultivator according to the present disclosure has the effect of being capable of preventing the cultivation water stored in the water tank part from rushing to one side so that the cultivation water does not easily overflow, preventing water overflow when the user moves the plant cultivator or the water tank part, and effectively preventing cultivation water from overflowing by removing or moving horizontally the water tank part when moving the plant cultivator.

In addition to the above-described effects, specific effects of the present disclosure are described below while explaining specific details for carrying out the disclosure.

BEST MODE

Figure 1:
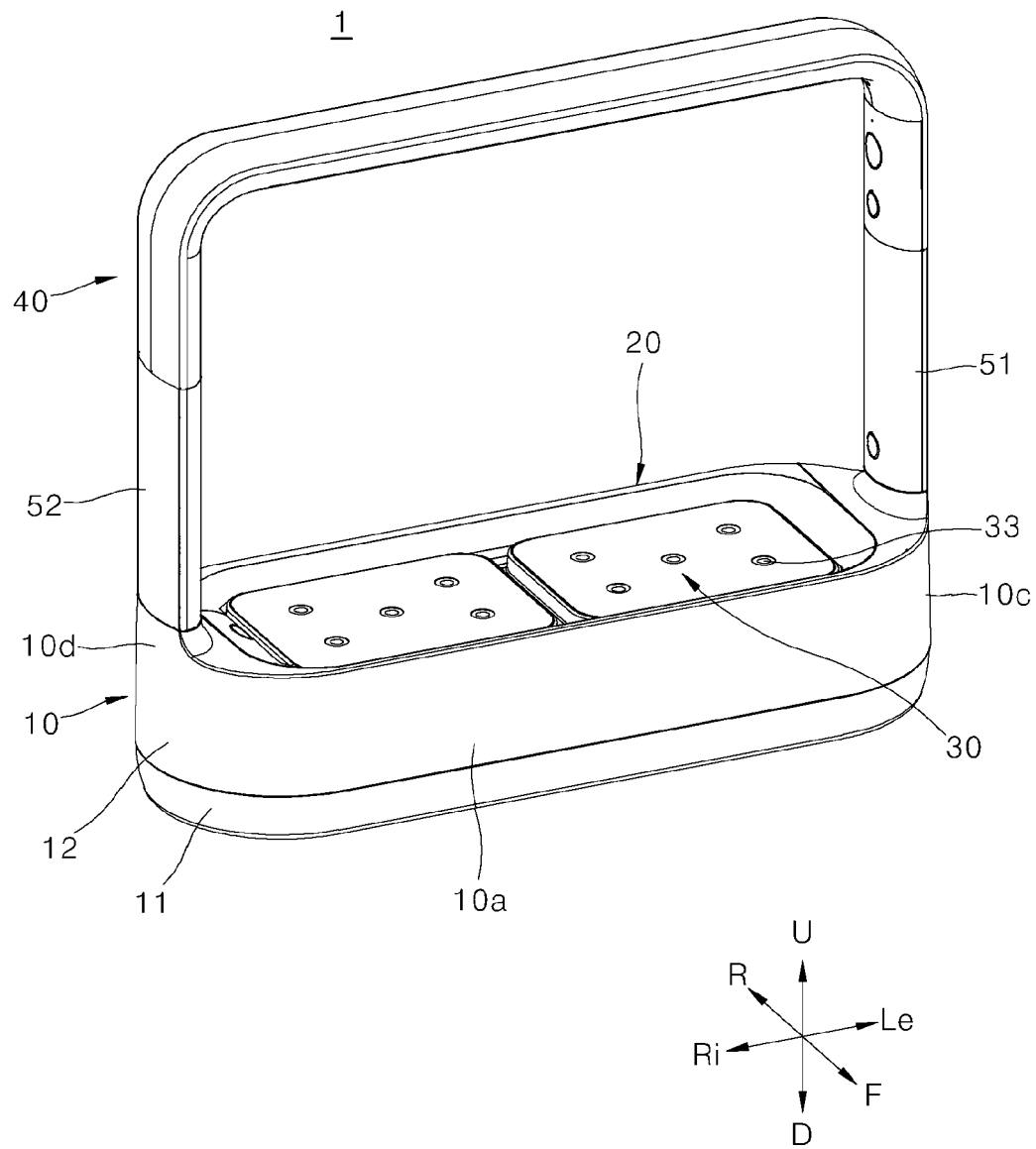
FIG. 1 is a front perspective view of a plant cultivator according to a first embodiment of the present disclosure.

The objects, features, and advantages described above will be described in detail later with reference to the attached drawings, so that those skilled in the art will be able to easily implement the technical idea of the present disclosure. In describing the present disclosure, if it is determined that a detailed description of known technologies related to the present disclosure may unnecessarily obscure the subject matter of the present disclosure, the detailed description will be omitted. Hereinafter, preferred embodiments according to the present disclosure will be described in detail with reference to the attached drawings. In the drawings, identical reference numerals are used to indicate identical or similar components.

Although first, second, or the like is used to describe various components, these components are, of course, not limited by these terms. These terms are only used to distinguish one component from another component, and unless specifically stated to the contrary, the first component may also be a second component.

Throughout the specification, unless otherwise stated, each component may be singular or plural.

Hereinafter, the disposition of any component on the "upper portion (or lower portion)" of a component or the "top (or bottom)" of a component may mean that any component is disposed in contact with the upper surface (or lower surface) of the component and other components is interposed between the component and any element disposed on (or under) the component.

Additionally, when a component is described as being "connected," "coupled," or "joined" to another component, it should be understood that the components may be directly connected or joined to each other, but the other component is "interposed" between components, or each component may be "connected," "combined," or "joined" through other components.

As used herein, singular expressions include plural expressions unless the context clearly dictates otherwise. In the present application, terms such as "consists of" or "comprises" should not be construed as necessarily including all of the various components or steps described in the specification, and should be construed as not including some of the components or steps, or as including additional components or steps.

In addition, as used herein, singular expressions include plural expressions unless the context clearly dictates otherwise. In the present application, terms such as "consists of" or "comprises" should not be construed as necessarily including all of the various components or steps described in the specification, and should be construed as not including some of the components or steps, or as including additional components or steps.

Throughout the specification, when referred to as "A and/or B", this means A, B or A and B, unless specifically stated to the contrary, and when referred to as "C to D", this means that it is C or higher and D or lower, unless specifically stated to the contrary.

Hereinafter, the overall structure of the plant cultivator 1 according to the first embodiment of the present disclosure will be described in detail with reference to the attached drawings.

Figure 2:
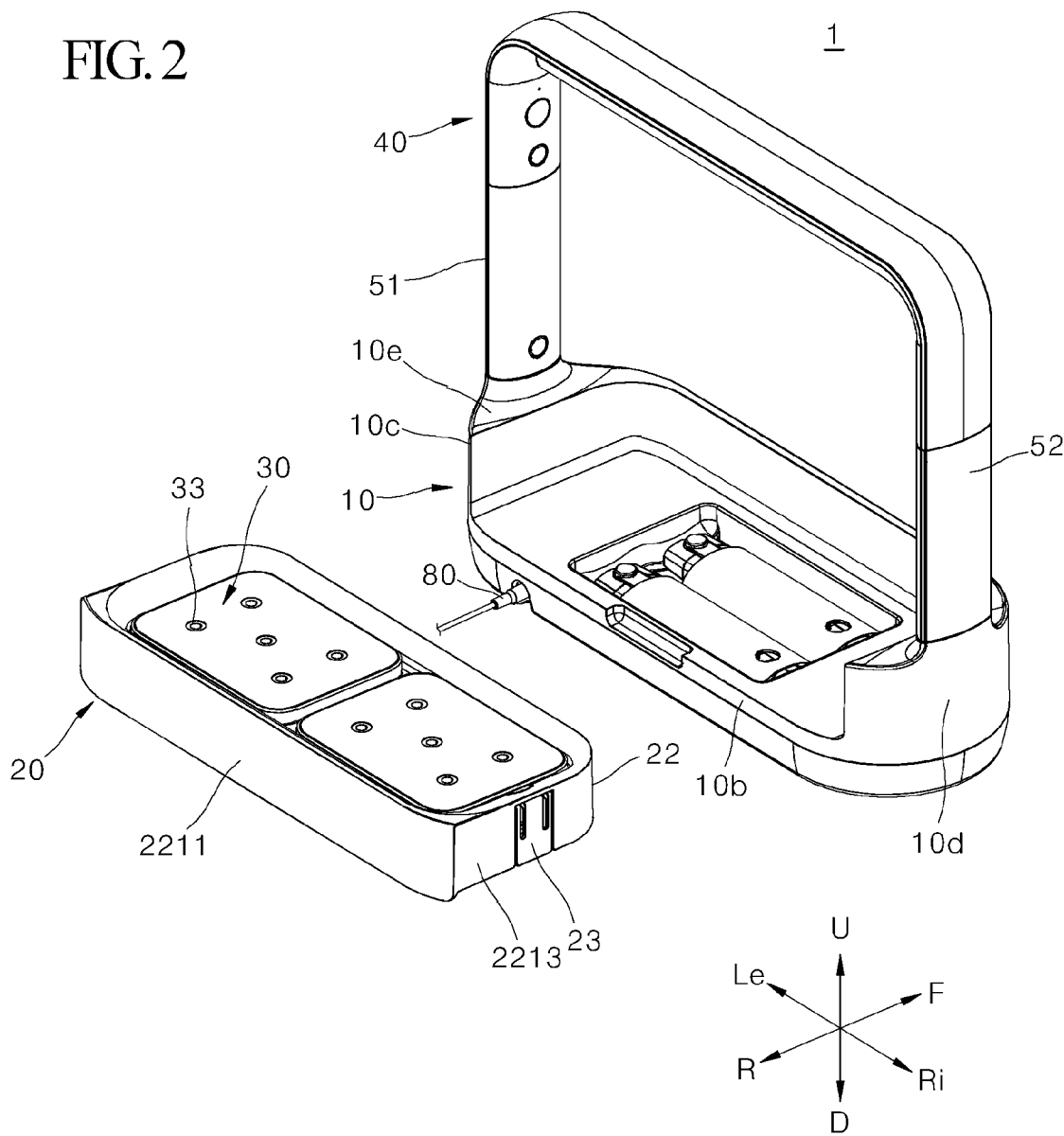
FIG. 2 is a rear perspective view of the plant cultivator illustrated in FIG. 1.
Figure 3:
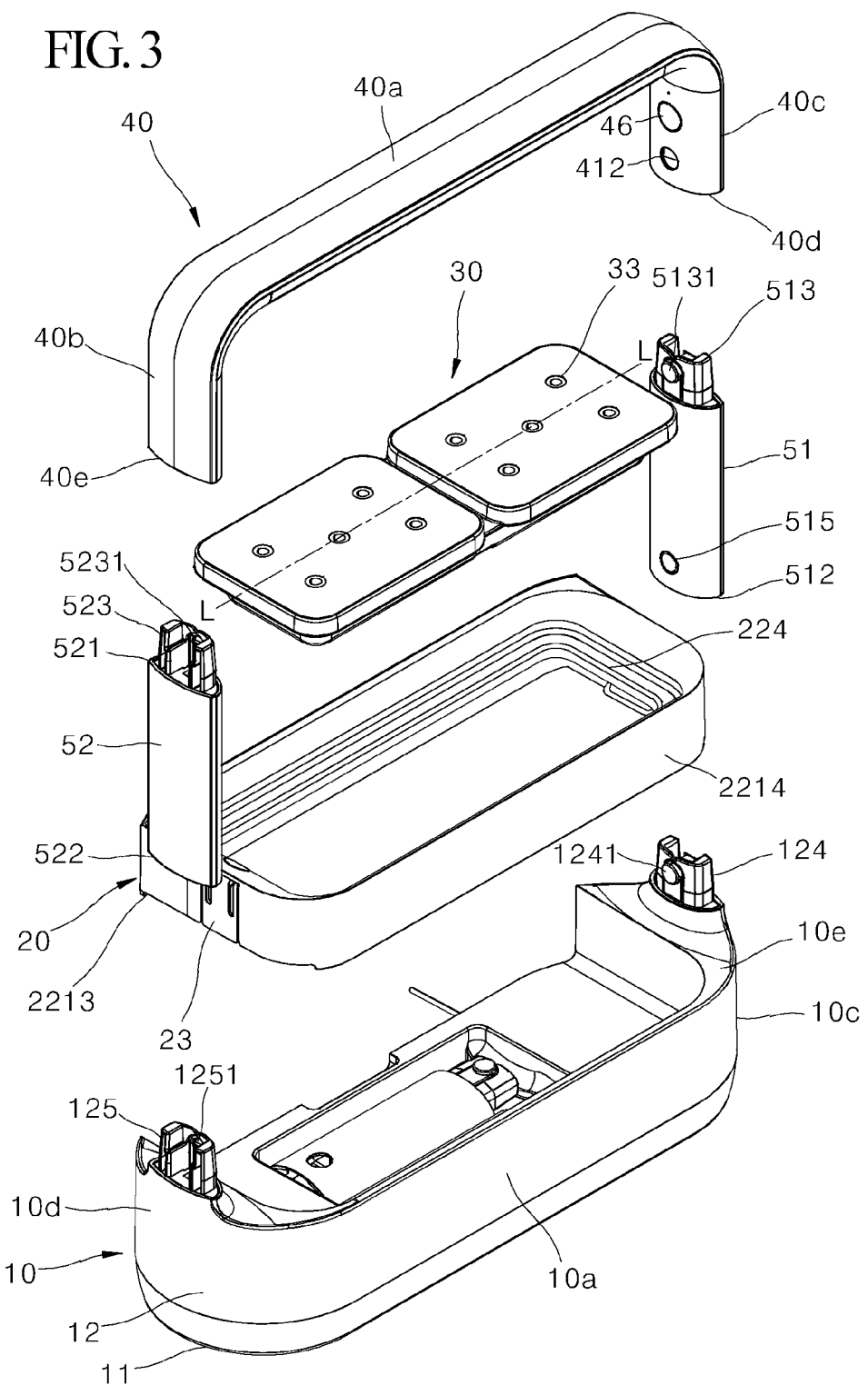
FIG. 3 is an exploded perspective view of FIG. 1.
Figure 4:
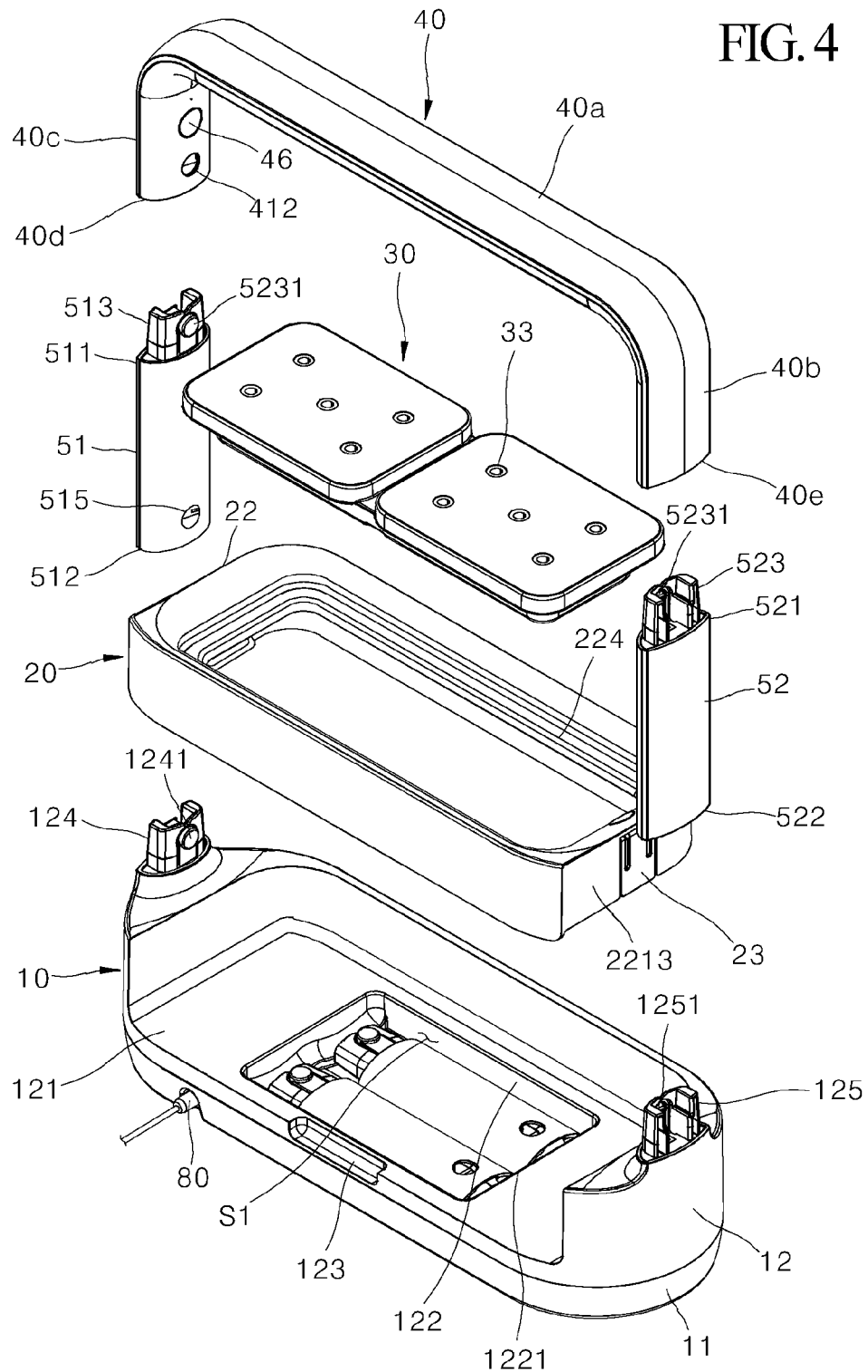
FIG. 4 is an exploded perspective view of FIG. 2.

FIG. 1 is a front perspective view of a plant cultivator 1 according to a first embodiment of the present disclosure, FIG. 2 is a rear perspective view of the plant cultivator 1 illustrated in FIG. 1, FIG. 3 is an exploded perspective view of FIG. 1, and FIG. 4 is an exploded perspective view of FIG. 2.

As used herein, singular expressions include plural expressions unless the context clearly dictates otherwise. In the present application, terms such as "consists of" or "comprises" should not be construed as necessarily including all of the various components or steps described in the specification, and should be construed as not including some of the components or steps, or as including additional components or steps. As illustrated in FIGS. 1 to 4, the plant cultivator 1 according to the first embodiment of the present disclosure may include a cultivation port part 30 provided with at least one medium 33 for plant growth, a water tank part 20 on which the cultivation port part 30 is mounted and which stores cultivation water to be supplied to the medium 33, a main body part 10 to which the water tank part 20 is detachably coupled, and a handle part 40 disposed on the upper side of the main body part 10 and provided with a light source part 60.

As described above, the plant cultivator 1 according to the present disclosure is an open type, not a closed type.

Accordingly, at least the upper surface of the cultivation port part 30, where plants are cultivated and grown, is exposed to the indoor environment, that is, indoor air. More specifically, considering the characteristic of plants having a growth direction that generally grows in an upward direction (U-direction) opposite to the direction of gravity, the upper surface of the cultivation port part 30 is entirely open and exposed to the indoor environment.

In addition, the cultivation port part 30 in the present disclosure is modularized to be compatible with the above-described closed plant cultivator.

In other words, after germinating seeds in the plant cultivator 1 of the present disclosure, plants can be grown by moving and placing the cultivation port part 30 in a closed plant cultivator that can provide a better cultivation environment.

Conversely, the cultivation port part 30, which is being used in a closed plant cultivator, can be moved to the plant cultivator 1 to grow plants. As will be described later, since the height of the light source part 60 of the present disclosure can be adjusted, it can be preferably applied when it is desired to grow plants that are difficult to grow in a closed plant cultivator due to the growth height of the plants by moving them to the plant cultivator 1.

Meanwhile, the cultivation port part 30 may be assembled and seated in the water tank part 20, which will be described later, in a non-fastening manner.

Here, the meaning of being assembled in a non-fastening manner to the water tank part 20 means that the cultivation port part 30 can be assembled with the water tank part 20 without a separate fastening means, and means that it has a structure that the cultivation port part 30 cannot move by itself due to its own weight in a state of being assembled and seated, but can be easily separated and removed without separate disassembly operation.

In particular, as illustrated in FIG. 3, the cultivation port part 30 may have a symmetrical shape with respect to the dividing line L dividing the front and rear direction (F-R direction). Therefore, when it is removed from the water tank part 20 and then mounted again, it can be configured to be mounted even with the front and back sides reversed.

In this case, the cultivation port part 30 can be supported in the direction of gravity on the water tank part 20 and can be assembled by simply mounting it on the water tank part 20.

Therefore, when the user wants to move the cultivation port part 30 to a closed plant cultivator or separate the cultivation port part 30 from the water tank part 20 to replenish cultivation water, the cultivation port part 30 may be easily removed simply by lifting the cultivation port part 30 in the upward direction (U-direction) without a separate disassembly operation. Accordingly, user convenience may be improved.

To allow the user to easily hold the cultivation port part 30 to separate it, a cultivation port holding space S3 may be formed between the upper end of the cultivation port part 30 and the water tank part 20.

Meanwhile, the cultivation port part 30 may be provided with a plurality of media 33 to support the plants and protect the roots of the plants.

The medium 33 may be made of a porous material that facilitates the absorption of culture water and is advantageous for plant root growth. Since any configuration known in the art can be applied to the medium 33, description of the detailed configuration will be omitted.

Meanwhile, the drawing illustrates an embodiment in which a total of 10 media 33 are divided into two locations and provided in the cultivation port part 30. The number of media 33 may be changed and provided differently according to the size of the cultivation port part 30. The present disclosure is not limited to this, but will be described based on an embodiment in which a total of 10 media 33 are divided into two locations and provided in the cultivation port part 30, as illustrated.

The water tank part 20 disposed at the lower portion of the cultivation port part 30 mounts the cultivation port part 30 and serves to support the cultivation port part 30 and to store culture water to be supplied to the plants.

To this end, the water tank part 20 may include a water tank body 21 that stores cultivation water, and a water tank cover 22 that supports the cultivation port in a mounted manner.

A mounting surface 224 may be formed on the upper side of the water tank cover 22 to support the cultivation port part and to set the position of the cultivation port part. An insertion hole 225 may be formed inside the mounting surface 224 into which the lower end of the cultivation port part is inserted.

The water tank body 21 and the water tank cover 22 may be detachably coupled to each other through a separate fastening means, and for example, the detachment means may be a fastening lever 23 having one end portion which may be rotatably connected to either the water tank body 21 or the water tank cover 22 and the other end portion which may be engaged with either the water tank body 21 or the water tank cover 22.

The water tank part 20 may have an overall rectangular shape with a width in the left and right direction (Le-Ri direction) that is larger than the front and rear direction (F-R direction) and may have any height in a vertical direction (U-D direction) sufficient to accommodate the cultivation port part as a whole.

The water tank part 20 may be made of a lightweight material while maintaining a predetermined strength. Preferably, the water tank body 21 and the water tank cover 22 of the water tank part 20 may be manufactured through plastic injection molding.

At this time, the water tank body 21 and the water tank cover 22 that constitute the water tank part 20 may be made of an opaque plastic material.

Furthermore, as described above, the upper end of the cultivation port part 30, to which light is directly emitted from the light source part 60, which will be described later, may be made of an opaque plastic material.

Therefore, most of the light emitted from the light source part 60 cannot reach the cultivation water stored inside the water tank part 20, and the possibility of moss growing inside the water tank part 20 and the amount of moss growth may be minimized.

Meanwhile, the rear surface 2211 of the outer wall surface 221 of the water tank cover 22 forming the outer surface of the water tank part 20 is directly exposed to the outside when coupled to the main body part 10, which will be described later, and forms a portion of the rear surface of the plant cultivator 1. At this time, in order to form a sense of unity, the rear surface 2211 of the water tank cover 22 forms a continuous surface with the outer surfaces 10*c* and 10*d* constituting the main body peripheral surface of the main body part 10.

The water tank part 20 is coupled to and seated on the main body part 10 in a non-fastening manner, similar to the cultivation port part 30 described above. Therefore, the water tank part 20 can be mounted on the main body part 10 without a separate fastening means.

Accordingly, the user can separate the water tank part 20 from the main body part 10 or seat it on the main body part 10 without a separate uncoupling or coupling operation.

When attempting to separate the water tank part 20 while the water tank part 20 is seated on the main body part 10, the water tank part 20 can be easily separated through manipulation that the user simply lifts it in the direction of the arrow in FIG. 2 while holding the water tank part 20.

As the lower portion of the water tank part 20, a holding groove part 123 may be formed on the rear surface 10*b* of the main body part 10 to enable the user to effectively hold.

The width and height of the holding groove part 123 may be formed to have a size that allows the user's fingers to easily enter.

As will be described later, in response to this, a water tank holding space S2 may be formed in the lower portion of the water tank part 20, having a depth sufficient for the user's fingers to enter so that the user can effectively grasp the water tank part.

Meanwhile, the water tank part 20 may be provided with positioning means to set a correct position to be seated and prevent the water tank part 20 from removing from the correct position.

Such a positioning means may be provided on the water tank body 21, and for example, the positioning means may be a guide rib integrally formed on the lower surface of the water tank body 21.

The guide rib may have an outer shape corresponding to the shape of the upper entrance 1221 of the engaging groove part 122 so that it can be inserted into the engaging groove part 122 formed in the main body part 10, which will be described later.

The seating position of the water tank part 20 may be accurately guided by the guide rib and the engaging groove part 122. When insertion of the guide rib is completed, the engaging groove part 122 may act as a stopper for the guide rib, and thus may restrict the relative movement in the front and rear direction (F-R direction) and the relative movement in the left and right direction (Le-Ri direction) with respect to the main body part 10.

By restricting the relative movement of the water tank part 20 in this way, the water tank part 20 can be effectively prevented from removing from its correct position.

Figure 6:
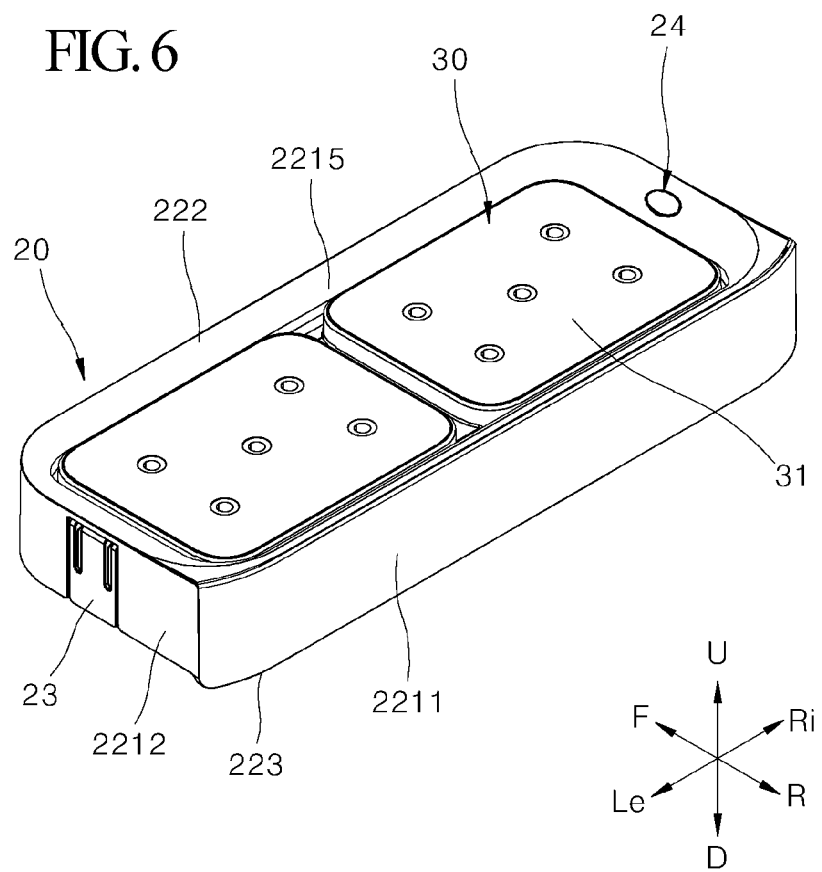
FIG. 6 is a rear perspective view illustrating a state where the cultivation port part is mounted on the water tank part according to the first embodiment of the present disclosure.
Figure 7:
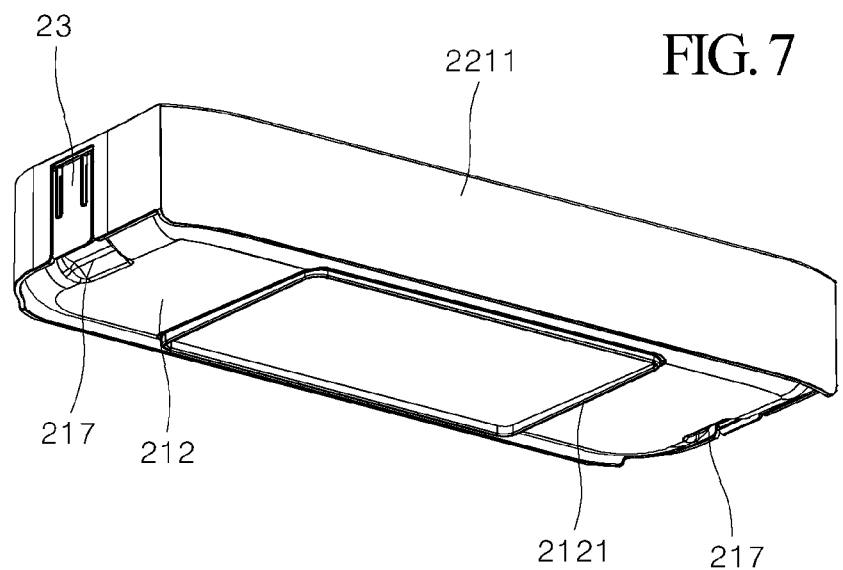
FIG. 7 is a bottom perspective view of FIG. 6.
Figure 8:
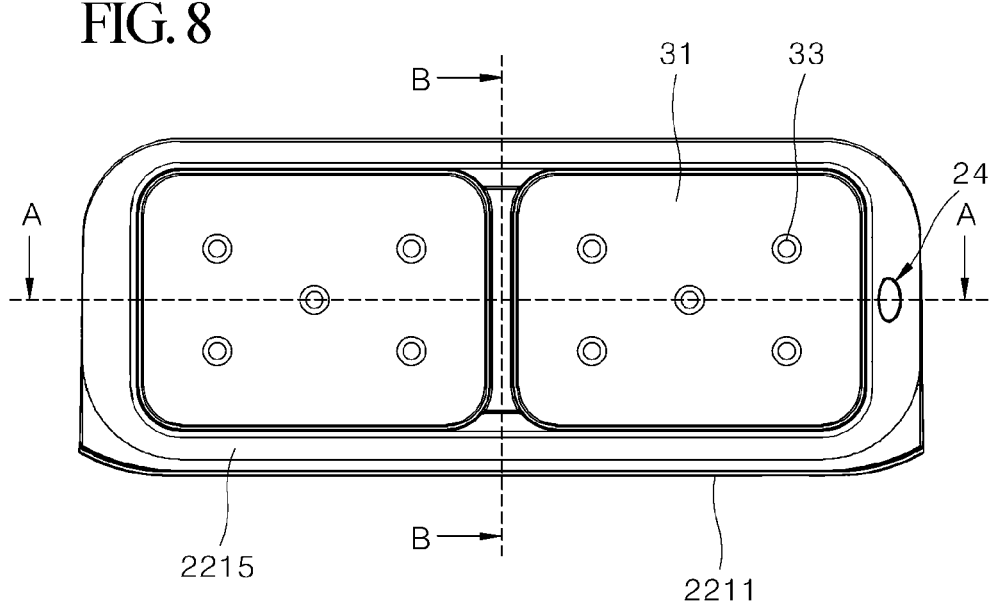
FIG. 8 is a plan view of FIG. 6.

The detailed configuration of the water tank part 20 will be described later with reference to FIG. 6 and below.

Meanwhile, the main body part 10 disposed below the water tank part 20 serves to accommodate the water tank part 20 and support the handle part 40, which will be described later.

In order to accommodate the water tank part 20, the upper surface 10*e* and the rear surface 10*b* of the main body part 10 are mostly open corresponding to the shape of the water tank part 20. The front surface 10*a* of the main body part 10 is closed to form the front surface of the plant cultivator 1.

The front surface 10*a* of the main body part 10 may be formed in the form of a flat surface. The forward movement of the water tank part 20 may be blocked by the front surface 10*a* of the main body part 10.

The left side 10*c* and the right side 10*d* of the main body part 10 may be provided in an arcuate shape with a predetermined curvature.

For example, the main body part 10 may be provided in a divided form in the vertical direction (U-D direction). These vertically divided bodies may include a first main body 11 corresponding to the lower divided body and a second main body 12 corresponding to the upper divided body.

The first main body 11 and the second main body 12 may each be manufactured through plastic injection molding. For example, similar to the water tank part 20, they may each be made from an opaque plastic material and then combined.

The present disclosure is not limited to this, but will be described below based on an embodiment in which the main body part 10 is formed by combining the first main body 11 and the second main body 12.

The water tank part 20 is coupled to and accommodated in the second main body 12.

As described above, an engaging groove part 122 engaging with the guide rib of the water tank part 20 may be formed on the bottom surface 121 where the water tank part 20 is coupled to the second main body 12.

As illustrated in FIG. 4, the engaging groove part 122 may be a concave groove part convex downward from the bottom surface 121 of the second main body 12 toward the first main body 11.

The shape of the upper inlet 1221 of the engaging groove part 122 may be configured to have a shape corresponding to the outer shape of the guide rib of the water tank part 20. The upper inlet 1221 of the engaging groove part 122 serves as a stopper that prevents relative movement of the guide rib of the water tank part 20 when the water tank part 20 is seated.

In addition to the stopper function of the guide rib, the engaging groove part 122 may perform the function of providing a space for storing spacers 51 and 52, which will be described later.

When the first spacer 51 and the second spacer 52 are separated from the main body part 10 and the handle part 40, respectively, both the separated first spacer 51 and the second spacer 52 may be accommodated inside the engaging groove part 122.

Accordingly, the inner space of the engaging groove part 122 can be a storage space S1 constituting a storage part in which the first spacer 51 and the second spacer 52 can be accommodated at the same time.

Inside the storage space S1, a shape part corresponding to the outer shape of the first spacer 51 and the second spacer 52 is provided so that the first spacer 51 and the second spacer 52 may be maintained in the stored state.

Meanwhile, as described above, the main body part 10 also serves to support the handle part 40.

In order to support the handle part 40 disposed on the upper side of the main body part 10*a*, first main body insert 124 may be provided on the upper left side of the second main body 12, and a second main body insert 125 may be provided on the upper right side of the second main body 12.

The first main body insert 124 may be coupled to an inside of the first end portion 40*d* of the handle part 40 in a manner that is coupled to a first handle fitting part 43 provided inside the first end portion 40*d* of the handle part 40, which will be described later.

Likewise, the second main body insert 125 may be coupled to an inside of the second end portion 40*e* of the handle part 40 in a manner that is coupled to a second handle fitting part 44 provided inside the second end portion 40*e* of the handle part 40.

The first main body insert 124 and the second main body insert 125 have cross sections of the upper end portions 511 and 521 that are smaller than the cross sections of the lower end portions 512 and 522 to facilitate entry into the first end portion 40*d* and the second end portion 40*e*.

Meanwhile, unlike the water tank part 20 and the cultivation port part 30, the handle part 40 may be coupled by a fastening method.

The first main body insert 124 and the second main body insert 125 may provide a force coupling means. By way of example, the forced coupling means of the fastening method may be elastic coupling parts 1241, 1251.

These elastic coupling parts 1241, 1251 may be provided in the first main body insert 124 and the second body insert 125, respectively, and the first main body insert 124 and the second body insert 125 are elastically deformed as they enter the first end portion 40*d* and the second end portion 40*e* of the handle part 40.

Afterwards, when the coupling of the first main body insert 124 and the second main body insert 125 is completed, while the elastic coupling parts 1241 and 1251 elastically return to their original shape thereof, the elastic coupling parts 1241 and 1251 acts to form an engagement with the first end portion 40*d* and the second end portion 40*e* of the handle part 40.

At the first end portion 40d and the second end portion 40e of the handle part 40, there is a coupling hole 412 having a shape corresponding to the outer shape of the elastic coupling parts 1241 and 1251 so that such an engagement coupling can be formed.

In order to separate the handle part 40 and the main body part 10 after completion of fastening, the separation can be done by pressing the elastic coupling parts 1241 and 1251 to elastically deform so that the elastic coupling parts 1241 and 1251 engaged with the coupling hole 412 are removed from the coupling hole 412.

However, the present disclosure is not limited to the forced coupling method using the elastic coupling parts 1241 and 1251 and the coupling hole 412, and in addition to this, any forced coupling means known in the art may be applied. Detailed description will be omitted below.

Meanwhile, as will be described later, power supply to the light source part 60 provided in the handle part 40 is provided only through the first handle fitting part 43, and for this purpose, the first main body insert 124 and the first handle joint part 43 may be provided with a connector for power supply.

Therefore, if the first main body insert 124 is incorrectly assembled or misconnected, such as when the first main body insert 124 is coupled to the second handle fitting part 44, power cannot be supplied to the light source part 60.

To prevent this, the first handle fitting part 43 and the second handle fitting part 44 may be provided with means for preventing misassembly or misconnection.

Meanwhile, the first main body 11 constituting the lower divided body of the main body part 10 may be provided with a power input terminal through which external power 80 is input. Although not illustrated, the power input terminal may be provided on the first main body 11 in the form of an outlet.

Additionally, the first main body 11 is in direct contact with a fixed surface such as the ground and a table and is supported on the fixed surface.

Therefore, although not illustrated, anti-slip pads for shock absorption and slip prevention may be provided at a plurality of locations on the lower side of the lower surface of the first main body 11. For shock absorption and anti-slip functions, the anti-slip pad may be made of a rubber material with certain elasticity.

Meanwhile, the above-described spacers 51 and 52 may be connected between the handle part 40 and the main body part 10.

The spacers 51 and 52 are used to adjust the height of the handle part 40.

In particular, the handle part 40 is provided with a light source element 62 constituting the light source part 60, as will be described later. Therefore, the plant cultivator 1 according to the present disclosure has the feature of being able to adjust the height of the light source element 62 using the spacers 51 and 52.

Through this, it is possible to adjust the height of the light source part 60 according to the growth height of the plant using the spacers 51 and 52.

The lower end portion 512 of the first spacer 51 connected to the first main body insert 124 of the second main body 12 has a first spacer fitting part 514 having the same configuration as that of the above-described first handle fitting part 43 may be provided. In addition, the upper end portion 511 of the first spacer 51 may be provided with a first spacer insert 513 having the same configuration as the main body insert 124 so that it can be coupled to the first handle fitting part 43 formed at the first end portion 40d of the handle part 40. Therefore, the first spacer insert 513 may be provided with an elastic coupling part 5131 like the first main body insert 124 to implement a forced coupling function.

Likewise, the lower end portion 522 of the second spacer 52 connected to the second main body insert 125 of the second main body 12 may be provided a second spacer fitting part 524 having the same configuration as that of the second handle fitting part 44. In addition, the upper end portion 521 of the second spacer 52 is provided with a second spacer insert 523 having the same configuration as the main body insert 125 of the main body part 10 so that it can be coupled to the second handle fitting part 44 formed at the second end portion 40e of the handle part 40. Therefore, the second spacer insert 523 may be provided with an elastic coupling part 5231 like the second main body insert 125 to implement a forced coupling function.

At this time, the means for preventing misassembly or misconnection provided on the first handle fitting part 43 and the second handle fitting part 44 of the handle part 40 may be equally provided at the lower end portion 512 of the first spacer 51 and at the lower end portion 522 of the second spacer 52.

Meanwhile, the handle part 40 disposed on the upper side of the main body part 10 provides a handle function that the user can hold when moving the plant cultivator 1.

In addition, the handle part 40 may additionally perform the function of receiving and supporting the light source part 60 that emits light toward the cultivation port part 30. Accordingly, the handle part 40 may be referred to as a housing or holder of the light source part 60, considering its relationship to the light source part 60. Hereinafter, for convenience, the member that serves to accommodate and support the light source part 60 will be referred to as the handle part 40 and will be described.

Specifically, the handle part 40 may be provided with a horizontal extension part 40a extending across the upper side of the main body part 10 in the left and right direction. Inside the horizontal extension part 40a, the light source part 60 may be disposed to entirely cover the cultivation port part 30 in the left and right direction.

In this way, the light source part 60 is disposed on the horizontal extension part 40a so that the emission distance of the light generated from the light source part 60 toward the cultivation port part 30 is maintained constant.

Figure 5:
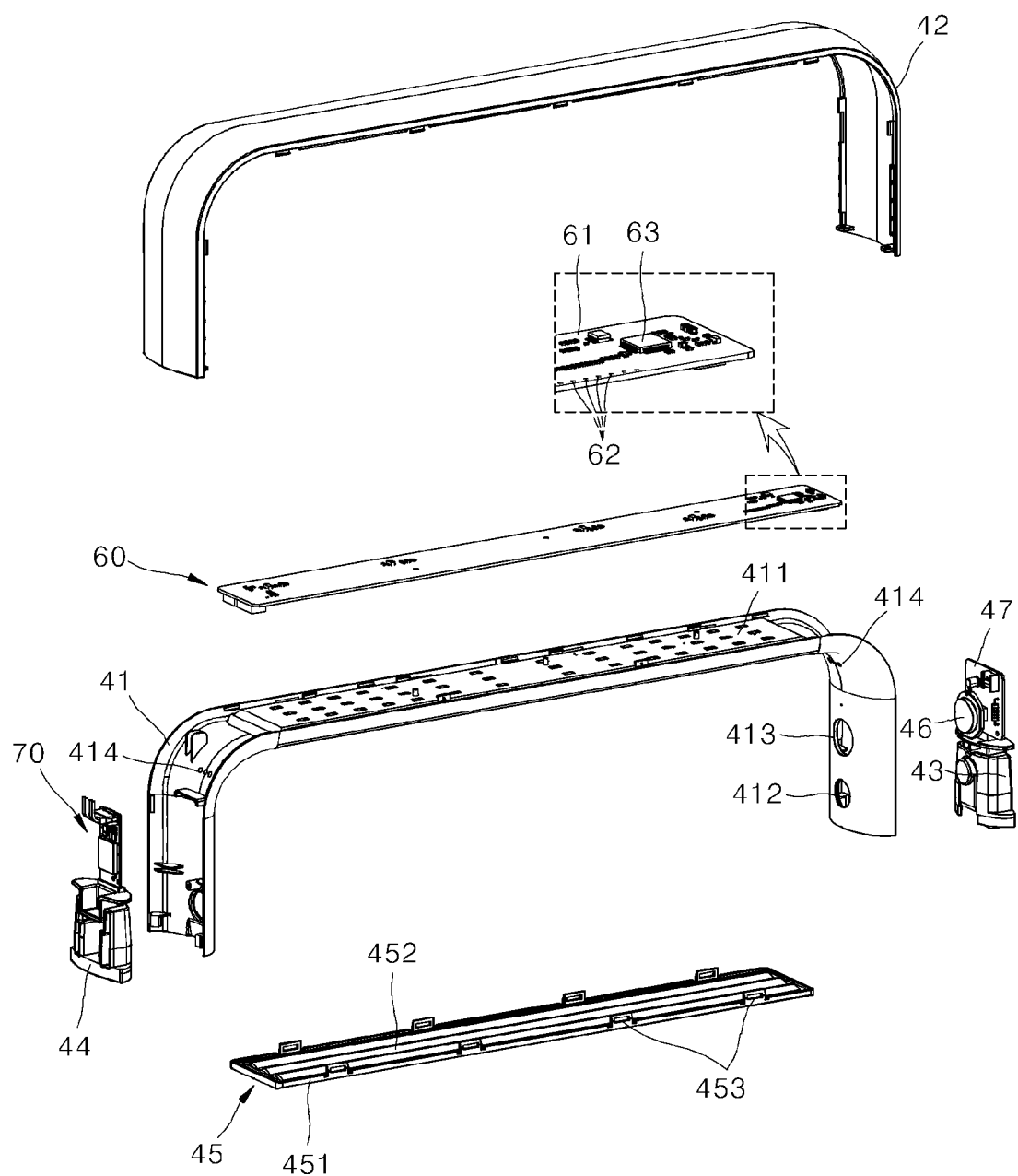
FIG. 5 is an exploded perspective view of the handle part illustrated in FIG. 1.

As illustrated in FIG. 5, the light source part 60 may include a circuit board 61 extending long in the left and right direction, a plurality of light source elements 62 disposed on the lower surface of the circuit board 61, and a controller 63 determining the power supply to a light source element 62.

Each light source elements 62 may be a light emitting diode chip or a package including a light emitting diode chip that can generate visible light by converting electrical energy into visible light. Hereinafter, the description will be based on an embodiment in which the each light source elements 62 is light emitting diode chips.

At this time, the visible light generated by the each light source elements 62 may be white light or red light having a wavelength range suitable for plant growth.

Only light emitting diode chips that generate white light may be disposed on the circuit board 61, or a combination of light emitting diode chips that generate white light and red light may be disposed on the circuit board 61.

The illustrated embodiment exemplarily illustrates an embodiment in which a plurality of light source elements 62 are disposed in three rows in the longitudinal direction of the circuit board 61. The present disclosure is not limited to this, but will be described based on an embodiment in which a plurality of light source elements 62 are arranged in three rows as illustrated.

Meanwhile, the spacing at which the plurality of light source elements 62 are arranged may vary according to the position where the each light source elements 62 is disposed.

As in the illustrated embodiment, the gap between the light source elements 62 arranged in the center of the substrate may be larger than the gap between the light source elements 62 arranged adjacent to both end portions of the substrate.

Meanwhile, the controller 63 disposed adjacent to the left end portion of the circuit board 61 plays a role in determining whether to supply power to the light source element 62, the power supply time, or the like.

The controller 63 may be provided in various forms, such as a microcontroller, microcomputer, or microprocessor, as is known in the art.

Meanwhile, the handle part 40 may include a first downward extension part 40b and a second downward extension part 40c extending downwardly from both end portions of the horizontal extension part 40a, respectively.

As illustrated, the first downward extension part 40b may be provided with a first handle fitting part 43, and a switch part 46 may be provided on the upper side of the first handle fitting part 43.

Additionally, the second downward extension part 40c may be provided with a second handle fitting part 44, and a wireless communication part 70 may be provided on the upper side of the second handle fitting part 44.

The switch part 46 is electrically connected to the above-described controller 63 and may be provided in the form of a push button as illustrated.

The switch part 46 is exposed to the outside through a switch hole 413 formed in the first handle body 41, which will be described later.

Accordingly, when the user operates the push button, the controller 63 can perform control to supply power to the light source element 62 or block the power supply according to the signal received from the push button. Additionally, the controller 63 can perform control to start or stop the operation of the wireless communication part 70 according to a signal received through a push button.

The wireless communication part 70 may, for example, be a WIFI module capable of two-way connection to the Internet network. The WIFI module can be electrically connected to the controller 63, and the controller 63 can be connected to the user's mobile terminal device through the WIFI module.

Furthermore, the controller 63 can exchange information with the above-mentioned closed plant cultivator and other plant cultivators through the WIFI module. Information about plants growing in each closed plant cultivator and other plant cultivators can be exchanged with each other. Here, information about the plant may include the species name of the plant, the number of days the plant grows, the time the light remains on, and the like.

Meanwhile, a status indicator light 47 may be disposed on the upper side of the switch part 46 to indicate whether the wireless communication part 70 is operating, through which the user can intuitively check whether the wireless communication part 70 is connected to the Internet network.

Additionally, similar to the main body part 10, the handle part 40 may be provided in a vertically divided form. These vertically divided bodies may include a first handle body 41 corresponding to the lower divided body and a second handle body 42 corresponding to the upper divided body.

The first handle body 41 and the second handle body 42 may each be manufactured through plastic injection molding, and for example, for the emission efficiency of the light element 62, each may be manufactured from an opaque plastic material and then combined.

Between the first handle body 41 and the second handle body 42, an accommodation space that can communicate between the first end portion 40d and the second end portion 40e may be formed, and the light source part 60, the wireless communication part 70, or the like, which is described above, may be accommodated in the accommodation space.

In addition, in this way, an air flow path for cooling the light source part 60 can be formed through the accommodation space that can communicate between the first end portion 40d and the second end portion 40e.

A plurality of ventilation holes 414 may be formed in the first handle body 41 to allow air to flow in and out of the air flow path.

As illustrated in FIG. 5, some of the plurality of ventilation holes 414 illustrated may be formed in the first downward extension part 40b and the remaining portions may be formed in the second downward extension part 40c.

Meanwhile, a plurality of light transmission holes 411 open toward the cultivation port part 30 may be formed in the first handle body 41.

A plurality of light transmission holes 411 may be provided in one-to-one correspondence with the plurality of light source elements 62 described above.

A light condensing structure may be formed in each light transmission hole 411 so that the light generated by the corresponding light source element 62 can be efficiently emitted to the cultivation port part 30.

In addition, the handle part 40 may further include a transparent cover 45 on the lower portion of the first handle body 41 that covers the plurality of light transmitting holes 411 in the downward direction.

As illustrated, the transparent cover 45 is provided with a transparent plate 451 made of a transparent material so that the light generated by the light source element 62 can be effectively transmitted.

Between the transparent plate 451 and the plurality of light transmission holes 411, light condensing lens parts 452 arranged in three rows corresponding to the arrangement direction of the light source elements 62 arranged in three rows may be provided.

The light condensing lens part 452 may be configured to have the shape of a convex lens that is formed to be convex upward toward the light transmitting hole 411 in order to increase the light condensing efficiency of the light passing through the light transmitting hole 411.

Accordingly, the amount of diffusion of light passing through the light condensing lens part 452 is minimized and converges toward the cultivation port part 30, so that the emission efficiency of the light source element 62 may be improved.

Meanwhile, a plurality of fastening tabs 453 for hook-type fixation to the first handle body 41 may be integrally provided at the front and rear edges of the transparent plate 451.

Hereinafter, the detailed configuration of the cultivation port part 30 and the water tank part 20 according to the first embodiment of the present disclosure will be described with reference to FIG. 6 and below.

First, as illustrated in FIGS. 6 to 9, the cultivation port part 30 may be seated or mounted on the water tank part 20 in a non-fastening manner.

In other words, the cultivation port part 30 is supported not to relatively move relative to the water tank part 20 with respect to the water tank part 20 in the front and rear direction, the left and right directions, and the downward direction, which is the direction of gravity, while being mounted on the water tank part 20.

However, since it is supported in a non-fastening manner, relative movement with respect to the water tank part 20 is possible in the upper direction opposite to the direction of gravity.

Figure 9:
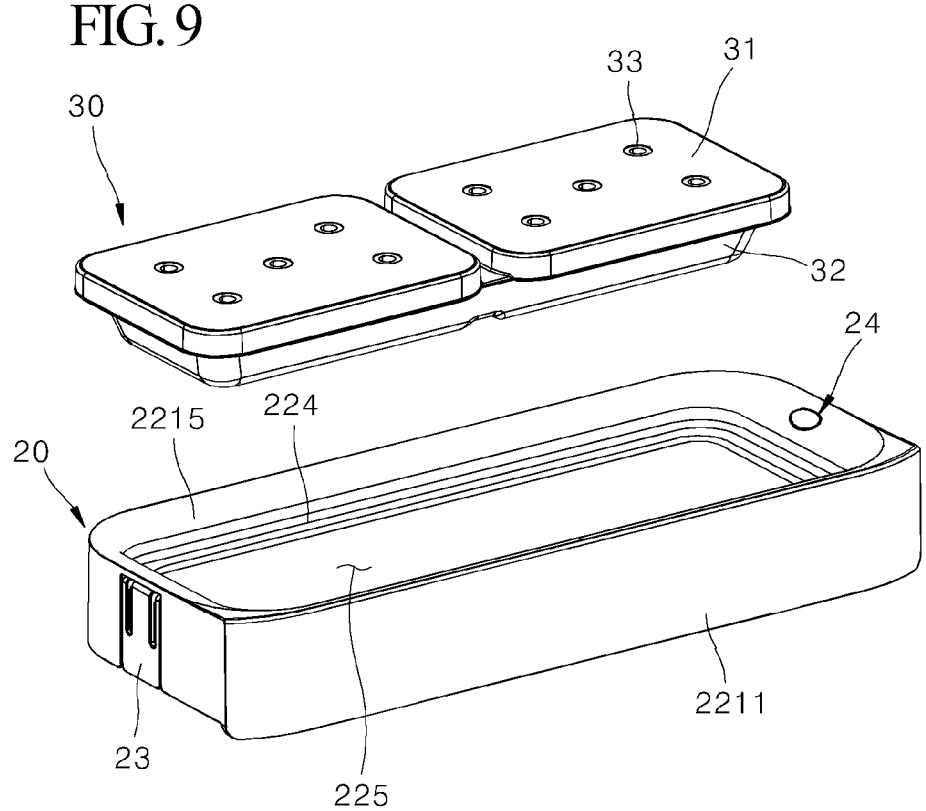
FIG. 9 is a rear perspective view illustrating a state where the water tank part and cultivation port part illustrated in FIG. 6 are separated.

Therefore, as illustrated in FIG. 9, the cultivation port part 30 can be easily separated from the water tank part 20 by simply lifting the cultivation port part 30 while it is mounted on the water tank part 20.

As will be described later, the water tank part 20 is provided with a water tank cover 22 for supporting the cultivation port part 30 in a non-fastening manner. More specifically, the cultivation port part 30 can be supported without relative movement in the front and rear direction, the left and right direction, and the downward direction through the mounting surface 224 provided on the water tank cover 22.

The detailed configuration of the water tank part 20 including the mounting surface 224 will be described later with reference to FIGS. 11 to 14.

Figure 10:
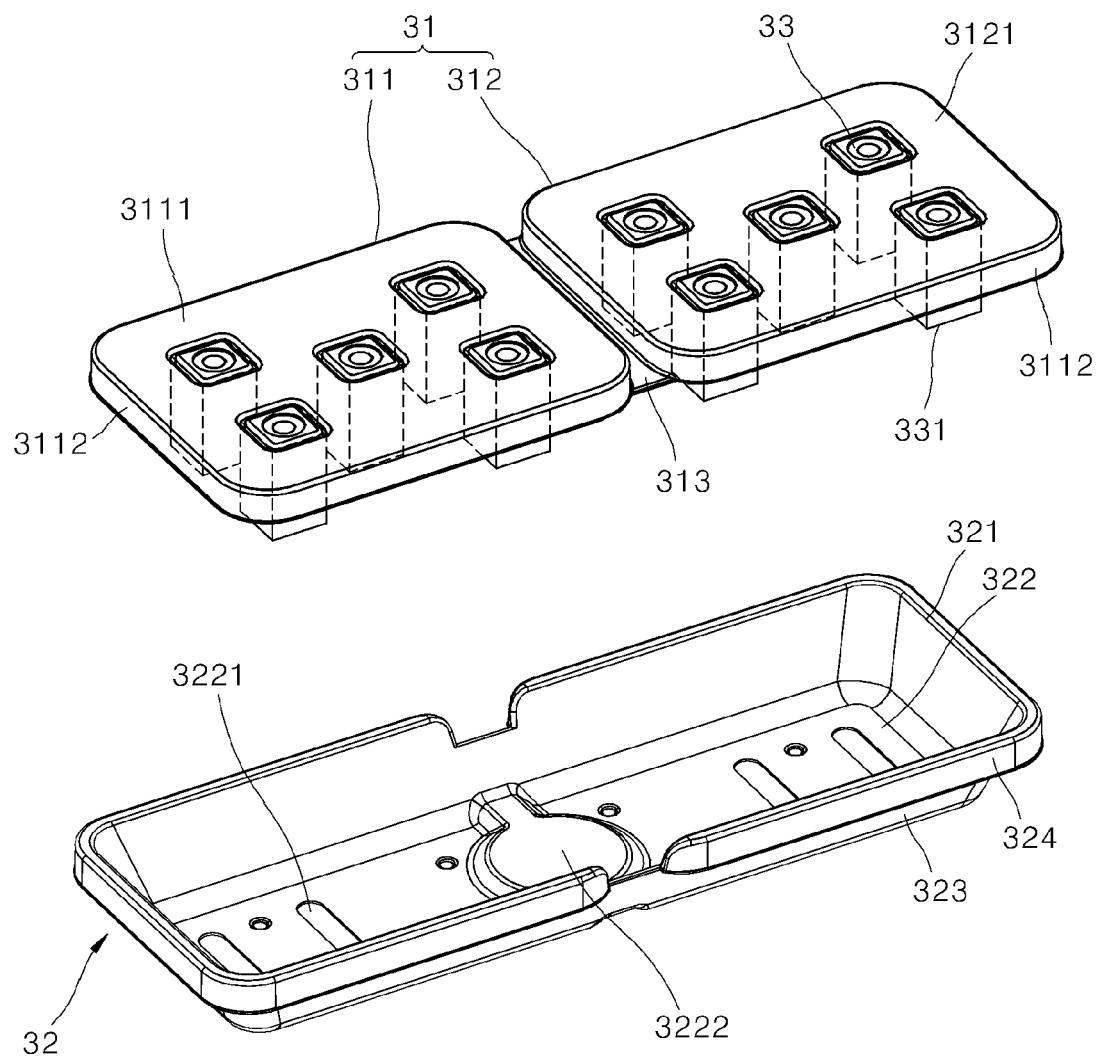
FIG. 10 is an exploded perspective view of the cultivation port part of FIG. 9.

Meanwhile, as illustrated in FIG. 10, the cultivation port part 30 mounted on the water tank part 20 may include at least one medium 33 on which plants are grown, a port body 32 supporting the lower end portion 332 of the medium 33, and a port cover 31 coupled to the open upper surface of the port body 32.

The medium 33 functions to support the plant and protect the roots of the plant.

As described above, the medium 33 may be made of a porous material that facilitates the absorption of culture water and is advantageous for plant root growth.

As illustrated in FIG. 10, when a plurality of media 33 is provided, the media may be disposed in a state of being separated at equal intervals from each other so that the amount of interference between the stems and leaves of plants growing in each media 33 is minimized, and cultivation water is evenly absorbed through the roots of the plants.

The port body 32 disposed at the lower portion of the medium 33 to support the lower end portion 332 of the medium 33 may have an overall open upper surface and may have a rectangular box shape with a width in the left and right direction larger than the width in the front and rear direction.

At this time, the outer wall surface 323 extending from the upper end 321 of the box-shaped port body 32 to the bottom surface 322 may be formed as a gradient surface having an inclined gradient so that the internal cross-sectional area is gradually reduced as it progresses downward. By forming a gradient surface in this way, entry into the insertion hole 225 of the water tank part 20 may be easily performed when inserting into the water tank part 20.

As will be described later, the outer wall surface 323, which becomes an inclined surface, may be in contact with the inclined surface part 2242 of the mounting surface 224 of the water tank cover 22 and be supported by the inclined surface part 2242.

Meanwhile, a plurality of through-holes 3221 may be formed in the bottom surface 322 of the port body 32.

The bottom surface 322 of the port body 32, which forms the lower end of the cultivation port part 30, corresponds to a portion which is inserted into the water tank body 21, which will be described later, and corresponds to a portion which is immersed in the cultivation water stored in the water tank body 21.

To allow cultivation water to smoothly enter the inside of the pot body 32, a plurality of through-holes 3221 may be formed in a plurality of locations on the bottom surface 322 of the pot body 32.

The upper end 321 of the port body 32 may be provided with a downward coupling surface 324 extending downward. The downward coupling surface 324 is a portion that is in direct contact with and coupled to the port cover 31, which will be described later, and may be extended to a predetermined height downward from the upper end 321 of the port body 32 to increase the coupling force to the port cover 31.

Meanwhile, the downward coupling surface 324 may not be formed on the center side of the upper end 321 of the port body 32 in the left and right direction. As such, the central portion where the downward coupling surface 324 is not formed corresponds to a portion corresponding to the location of the connection part 313 of the port cover 31, which will be described later.

Additionally, as illustrated, a raised surface 3222 protruding upward may be provided on the center side of the bottom surface 322 of the port body 32.

As illustrated, the area above the raised surface 3222 corresponds to the area where the disposition is not provided. Therefore, the raised surface 3222 can have the effect of increasing the water level of the cultivation water in areas where the raised surface 3222 is not formed.

The port cover 31 is coupled to the open upper surface of the port body 32 and serves to cover the upper surface of the port body 32.

Accordingly, the port cover 31 may have a rectangular shape in which the width in the left and right direction is larger than the width in the front and rear direction, corresponding to the shape of the upper surface of the port body 32.

In addition, the port cover 31 serves to support the upper end portion 331 of the each media 33. Specifically, the upper end portion 331 of the each media 33 is attached to the lower surface of the port cover 31.

A through-hole may be formed in the port cover 31 at a position corresponding to the each media 33 so that the plant can grow in response to the each media 33.

Meanwhile, as described above, when a plurality of media 33 are provided, the area where the media 33 are disposed may be divided as illustrated in FIG. 10.

For example, 5 media of a total of 10 media 33 may be disposed on the first cover part 311, and the remaining 5 media may be disposed on the second cover part 312.

The first cover part 311 and the second cover part 312 may have the same outer shape and size and may be provided in a mutually divided form.

A connection part 313 may be provided between the first cover part 311 and the second cover part 312 to connect them. As illustrated, the connection part 313 may be formed to have a width in the front and rear direction smaller than a width of the first cover part 311 and the second cover part 312. Additionally, the height of the upper surface of the connection part 313 may be formed to be lower than the height of the upper surface 3111 of the first cover part 311 and the height of the upper surface 3121 of the second cover part 312.

An outer wall surface 3112 extending downward may be formed at an edge of the upper surface 3111 of the first cover part 311, and similarly, an outer wall surface 3122 extending downward may be formed at an edge of the upper surface 3121 of the second cover part 312.

As will be described later, the outer wall surface 3112 of the first cover part 311 and the outer wall surface 3122 of the second cover part 312 may be in contact with the horizontal surface part 2241 of the mounting surface 224 of the water tank cover 22 and thus may be supported in the direction of gravity by the horizontal surface part 2241.

Meanwhile, as described above, the light source part 60 that emits light for plant growth is disposed on the upper side of the cultivation port part 30. The port cover 31 may be made of an opaque plastic material so that the amount of light emitted by the light source part 60 reaches the cultivation water stored inside the water tank part 20 is minimized.

Furthermore, the upper surface 3111 of the first cover part 311 and the upper surface 3121 of the second cover part 312 may be further provided with reflection means made of a material that can block the passage of light and reflect light toward the plants, and for example, the reflection means may be provided in the form of a reflection film.

As for the configuration of the other cultivation port part 30, means well-known in the art can be applied, so descriptions of portions overlapping with well-known parts will be omitted below.

Figure 11:
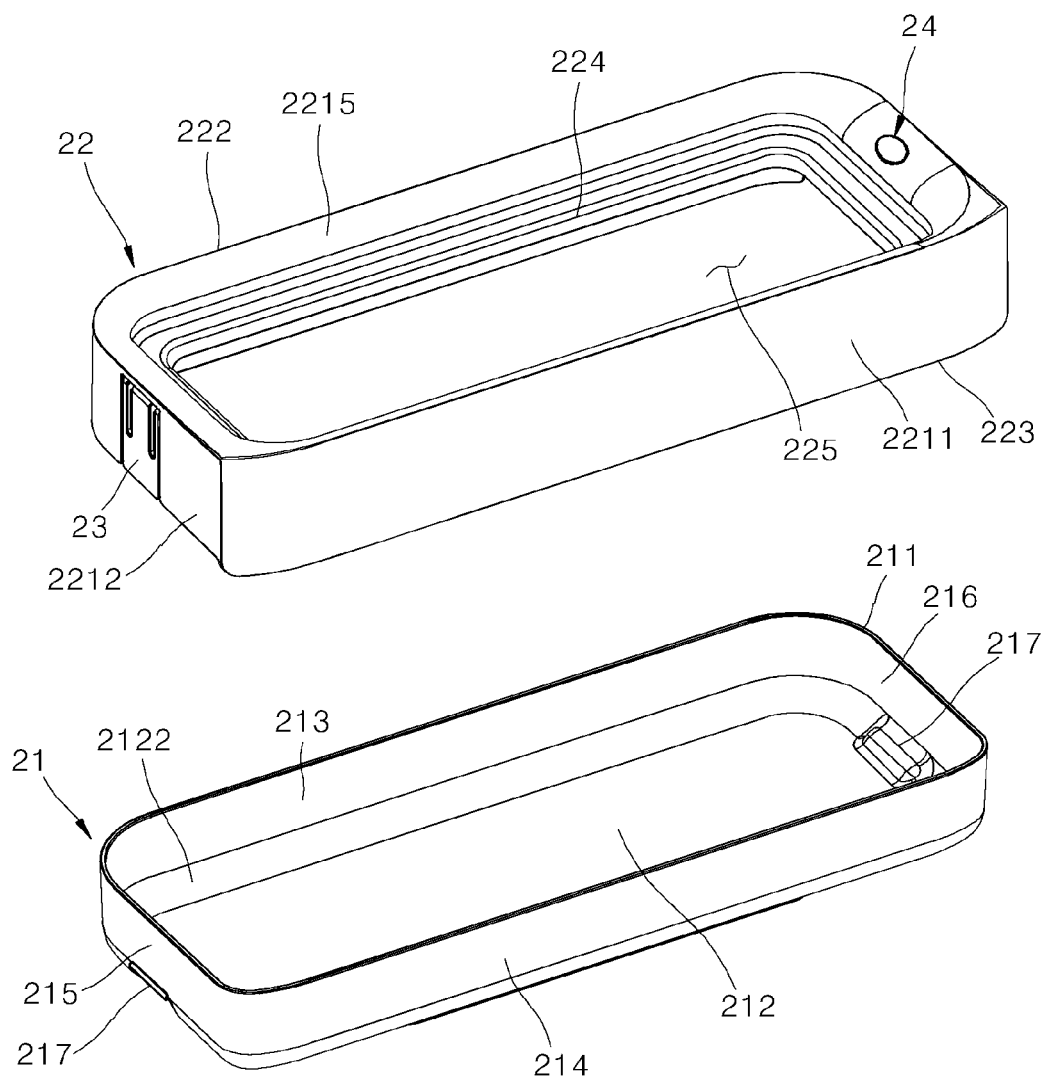
FIGS. 11 and 12 are exploded perspective views of the water tank part illustrated in FIG. 6.
Figure 12:
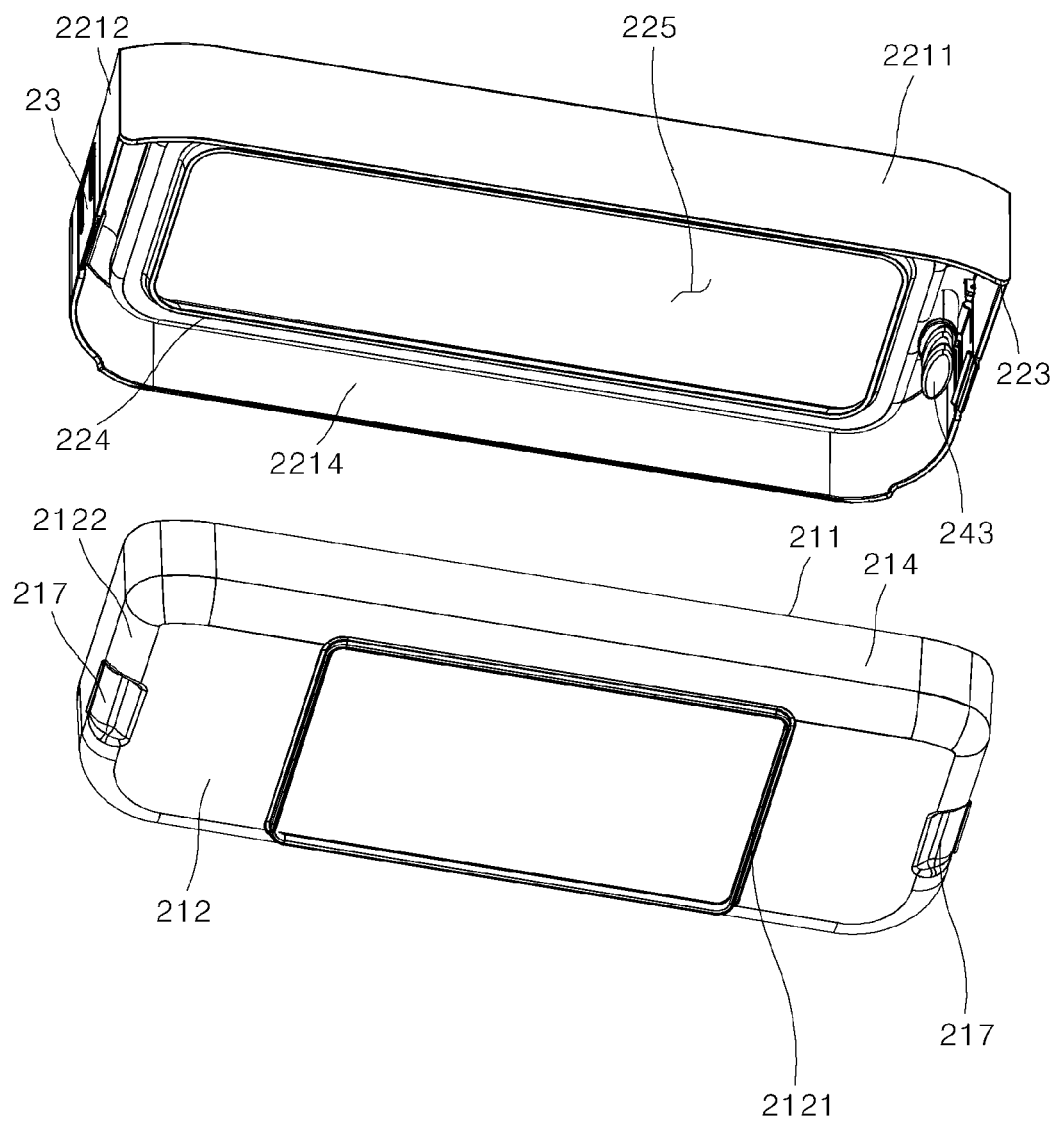

FIGS. 11 and 12 illustrate an exploded perspective view of the water tank part 20 on which the cultivation port part 30 is mounted or seated. The detailed configuration of the water tank part 20 will be described with reference to FIGS. 11 and 12.

The water tank part 20 includes a water tank body 21 that stores cultivation water and has an entirely open upper surface.

Similar to the port body 32 described above, the water tank body 21 may have a rectangular box shape with an overall open upper surface and a width in the left and right direction larger than the width in the front and rear directions However, since the cultivation port part 30 is accommodated inside the water tank body 21, the size of the pot body 32 may be larger than the size of the cultivation port part 30.

The bottom surface 212 of the water tank body 21 is supported by surface contact with the bottom surface of the first main body 11, as described above. Accordingly, the bottom surface 212 of the water tank body 21 may be provided in the form of a flat surface so that surface contact can be maintained with the bottom surface of the first main body 11, which is a flat surface.

Meanwhile, in order to form a box shape, the outer wall surface extending upward from the bottom surface 212 may be formed to have a small amount of an inclined gradient as it progresses to the upper end 211 in consideration of the moldability of the water tank body 21 manufactured by the plastic injection molding method. However, the gradient amount is smaller than the inclined gradient of the outer wall surface 323 of the port body 32 described above.

Figure 14:
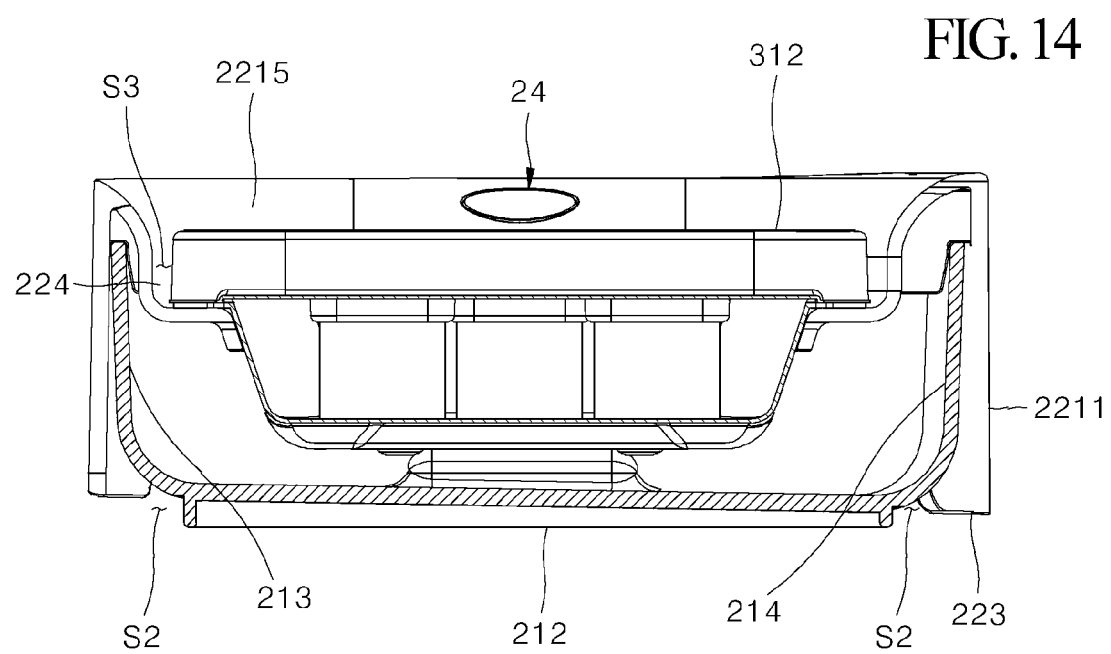
FIG. 14 is a cross-sectional view taken in the B-B direction of FIG. 8.

Meanwhile, a curved surface 2122 having a predetermined curvature may be formed at a portion where the front surface 213, rear surface 214, left side 215, and right side 216 constituting the outer wall surface are connected to the bottom surface 212, respectively. As illustrated in FIG. 14, this curved surface 2122, together with the rear surface 2211 of the water tank cover 22, can form a water tank holding space S2 to facilitate the user's holding.

Meanwhile, as described above, at the lower portion of the bottom surface 212 of the water tank body 21, there is a guide rib 2121 as a positioning means for setting the correct position where the water tank part 20 will be seated and preventing it from removing from the correct position.

The guide rib 2121 may be formed integrally with the lower portion of the bottom surface 212 of the water tank body 21.

The guide rib 2121 may have an outer shape corresponding to the shape of the upper inlet 1221 of the engaging groove part 122 so that the guide rib may be inserted into the engaging groove part 122 formed in the second main body 12.

As illustrated by way of example, the guide rib 2121 may be provided in a barrier shape in which the protruding height and thickness from the bottom surface 212 are maintained constant.

In addition, in response to the shape of the upper inlet 1221 of the engaging groove part 122, which is rectangular, the guide rib 2121 may have a rectangular shape in which the width in the front and rear direction is smaller than the width in the left and right direction, and to be advantageous for injection molding, the edge portion of the guide rib may be provided in a curved shape.

Meanwhile, the water tank part 20 may further include a water tank cover 22 that is coupled to the upper side of the water tank body 21 and at least partially covers the open upper surface of the water tank body 21.

As illustrated by way of example, the water tank cover 22 may have a rectangular box shape with the lower surface entirely open and the upper surface partially open.

When coupled to the water tank body 21, the outer wall surface 221 of the water tank cover 22 is formed to entirely cover the outer wall surface of the water tank body 21.

As described above, the rear surface 2211 of the outer wall surface 221 of the water tank cover 22 is directly exposed to the outside when coupled to the main body part 10, which will be described later, and forms a portion of the rear surface of the plant cultivator 1. At this time, the rear surface 2211 of the water tank cover 22 forms a continuous surface with the outer surfaces 10c and 10d of the main body part 10 to form a sense of unity.

The front surface 2214, left side 2212, and right side 2213 of the outer wall surfaces 221 of the water tank cover 22, correspond to portions that are not exposed to the outside when coupled to the main body part 10. However, the front surface 2214, left side 2212, and right side 2213 of the water tank cover 22 may be formed to have a shape corresponding to the inner surface of the engaging groove part 122 of the second main body 12.

Among the lower ends 223 of the outer wall surface 221, the lower end of the rear surface 2211 forms a water tank holding space together with the edge curved surface 2122 of the water tank body 21 described above.

Meanwhile, an expansion surface 2215 extending in a direction that covers the open upper surface of the water tank body 21 may be integrally provided at the upper end 222 of the outer wall surface 221.

The expansion surface 2215 may be formed to have a downward gradient toward the water tank body 21 as it progresses inward. Additionally, the expansion surface 2215 may form a curved surface with an upwardly convex curvature.

Since the expansion surface 2215 is formed as a curved surface with a downward gradient, as will be described later, between the outer wall surfaces 3112 and 3122 of the port cover 31 of the cultivation port part 30 and the expansion surface 2215, as illustrated in FIG. 14, a cultivation port holding space S3 may be formed.

Meanwhile, a mounting surface 224 supporting the cultivation port part 30 may be formed integrally with the inner edge of the expansion surface 2215.

More specifically, the mounting surface 224 may include a horizontal surface part 2241 extending in the horizontal direction from the inner edge of the expansion surface 2215, and an inclined surface part 2242 extending with a downward gradient from the inner edge of the horizontal surface part 2241.

The horizontal surface part 2241 may be provided to have a track shape extending in the horizontal direction. The lower end of the outer wall surface 3112 of the first cover part 311 and the lower end of the outer wall surface 3122 of the second cover part 312 of the cultivation port part 30 as described above may be supported in a state of being contact at the upper surface of the horizontal surface part 2241.

In other words, in a state where the cultivation port part 30 is mounted, the horizontal surface part 2241 supports the cultivation port part 30 in the direction of gravity and serves to prevent it from being removed.

Meanwhile, the inclined surface part 2242 is formed continuously on the horizontal surface part 2241 and may extend with a downward gradient. The inside of the inclined surface part 2242 remains entirely open, and the open portion functions as an insertion hole 225 into which the port body 32 of the cultivation port part 30 is inserted downward.

In a state where the cultivation port part 30 is mounted, the outer wall surface of the port body 32 of the cultivation port part 30 described above may be supported on the upper surface of the inclined surface part 2242 in a state of surface contact. In order to effectively maintain surface contact, the gradient angle of the inclined surface part 2242 of the mounting surface 224 and the gradient angle of the outer wall surface of the port body 32 at least in a portion where surface contact occurs may be set to be the same.

Figure 13:
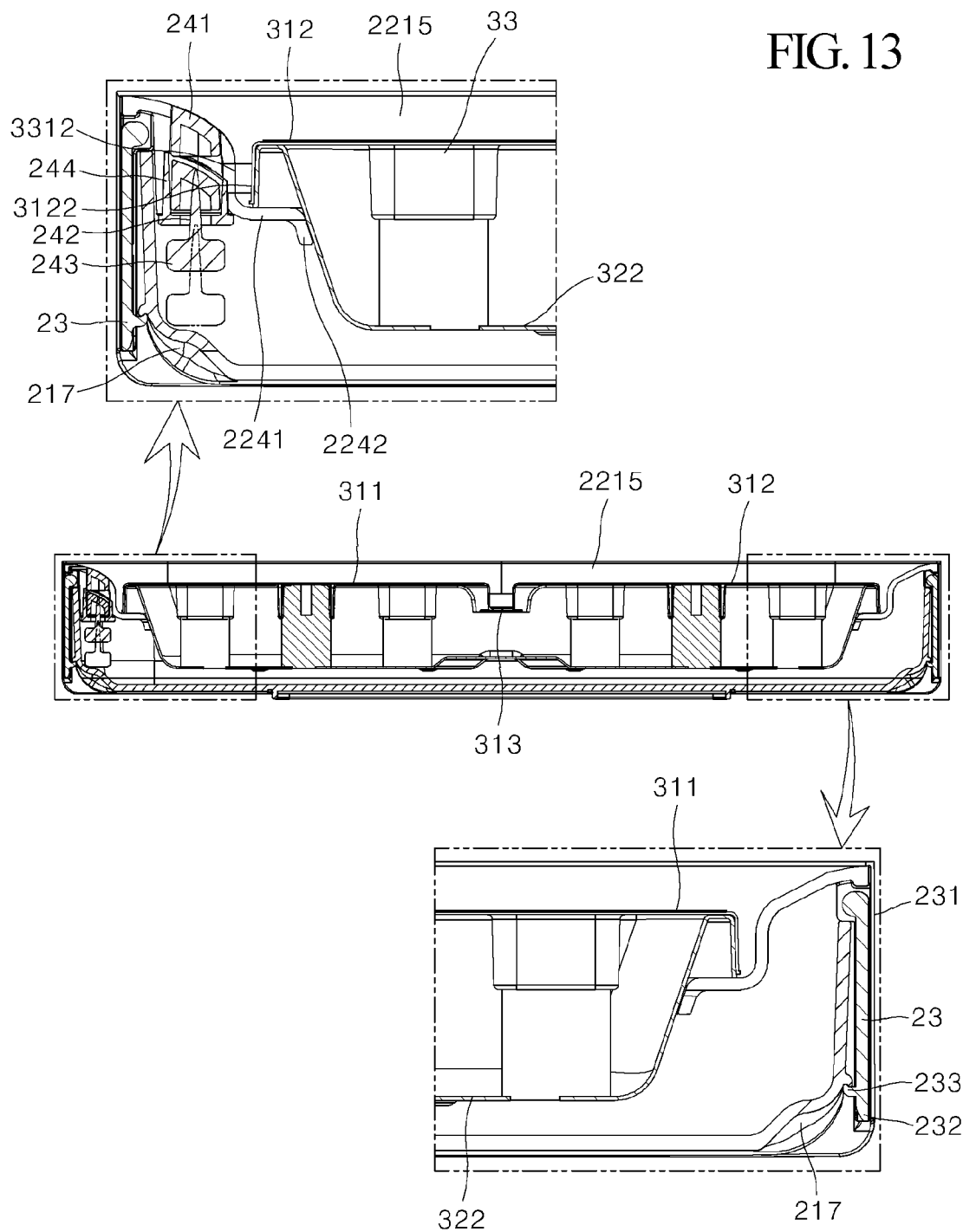
FIG. 13 is a cross-sectional view taken in the line A-A direction of FIG. 8 and a partially enlarged view.

In other words, as illustrated in FIGS. 13 and 14, the port cover 31 is supported by the horizontal surface part 2241 of the mounting surface 224, and the port body 32 may be achieved a structure of being supported by the inclined surface part 2242 and the load of the port cover 31 may be effectively distributed.

In addition, a positioning structure can be achieved in which, through the structure of the mounting surface 224, a double support structure for the cultivation port part 30 can be achieved, and automatic correct positioning of the cultivation port part 30 can be achieved by simply mounting the cultivation port part 30.

In addition, as illustrated in FIGS. 13 and 14, the area of the port cover 31 is formed to be larger than the area of the insertion hole 225. Therefore, when the cultivation port part 30 is seated on the mounting surface 224, the insertion hole 225 formed inside the mounting surface 224 may be maintained a state of being completely blocked or completely covered by the port cover 31.

Through this, the probability that light emitted to the light source part can enter the inside of the water tank body 21 is significantly reduced.

At this time, as described above, at least the port cover 31 is made of an opaque plastic material, so the possibility of light transmitting into the water tank body 21 can be further reduced.

For the same reason, the water tank cover 22, to which the light from the light source part is directly emitted, may be made of an opaque plastic material.

In this way, through means of preventing light from being transmitted into the inside of the water tank body 21, it is possible to minimize the possibility of moss forming inside the water tank body 21.

Meanwhile, the water tank cover 22 may be forcibly coupled to the water tank body 21 using a fastening method. As a force fastening means, the water tank part 20 may be provided with a pair of fastening levers 23.

As an example, the fastening lever 23 may be a plate-shaped rotating lever having an upper end 231 which is rotatably connected to the water tank cover 22 and a lower end 232 which is detachably and forcibly coupled to the water tank body 21, as illustrated.

For example, one of the pair of fastening levers 23 may be rotatably connected to the left side 2212 of the water tank cover 22, and the other may be rotatably connected to the right side 2213 of the water tank cover 22.

An engagement protrusion 233 protruding toward the water tank body 21 may be integrally provided on one side of the fastening lever 23.

At this time, the engagement protrusion 233 may be disposed adjacent to the lower end of the fastening lever 23.

One end portion of the engagement protrusion 233 may be integrally connected to the fastening lever 23, and a hook may be formed on the other end portion of the engagement protrusion 233.

As a position corresponding to the hook of the engagement protrusion 233, an engagement groove 216 to which the hook of the engagement protrusion 233 is forcibly coupled may be formed on the left side 215 and the right side 216 of the water tank body 21, respectively.

The engagement groove 216 may be formed by being recessed from the left side 215 and the right side 216 of the water tank body 21 toward the inside of the water tank part 20, respectively.

Meanwhile, the water tank part 20 may further include a water level display part 24 that is movable in the vertical direction according to the water level of the cultivation water stored in the water tank body 21.

By way of example, the water level display part 24 may be disposed adjacent to the right side 2213 of the water tank cover 22. At a location adjacent to the right side 2213 of the water tank cover 22, a guide hole penetrating in the vertical direction may be formed in the expansion surface 2215 of the water tank cover 22.

The water level display part 24 may include an exposed part 241 that is movable in the vertical direction along the guide hole, a buoyancy generating part 243 that is disposed inside the water tank body 21 and forms a vertical buoyancy according to the water level of the stored cultivation water, a connecting rod 242 connecting the exposed part 241 and the buoyancy generating part 243, and a removal prevention cap 244 that is coupled to the lower portion of the guide hole and prevents the water level display part 24 from being removed.

The upper surface of the exposed part 241 is exposed upward through the guide hole. Therefore, the user can easily determine the water level and remaining amount of cultivation water through the position of the exposed part 241 that moves in the vertical direction in conjunction with the water level.

Meanwhile, as illustrated in FIG. 13, the removal prevention cap 244 is attached to the lower portion of the guide hole and forms the lower end of the guide hole. At this time, the removal prevention cap 244 may have a completely different color from the color of the water tank cover 22.

In other words, if the removal prevention cap 244 is configured to have a highly visible color such as red and if the exposed part 241 is moved to a position lower than the upper end of the removal prevention cap 244, the user may check the color of the removal prevention cap 244, and through this, may intuitively check that the water level of the cultivation water has decreased.

At this time, the positions of the lowermost ends of the water level display part 24 and the buoyancy generating part 243 may be defined by the inner surface of the above-described engagement groove 216. In other words, the inner surface of the engagement groove 216 may function as a stopper defining the lower end of the buoyancy generating part 243 of the water level display part 24.

Meanwhile, as described above, when the cultivation port part 30 is seated on the mounting surface 224, the insertion hole 225 formed inside the mounting surface 224 can be maintained in a completely blocked state by the port cover 31 as a whole. In other words, since there is almost no gap between the water tank cover 22 and the cultivation port part 30 when the cultivation port part 30 is seated, it is almost impossible to supply cultivation water to the inside of the water tank body 21.

However, the plant cultivator according to one embodiment of the present disclosure provides a means for supplying cultivation water into the water tank body 21 even when the cultivation port part 30 is seated.

As a means of supplying cultivation water without separating the cultivation port part 30, the mounting surface 224 of the water tank cover 22 is provided with at least one cultivation water supply groove that is concave in a direction away from the insertion hole 225.

Figure 15:
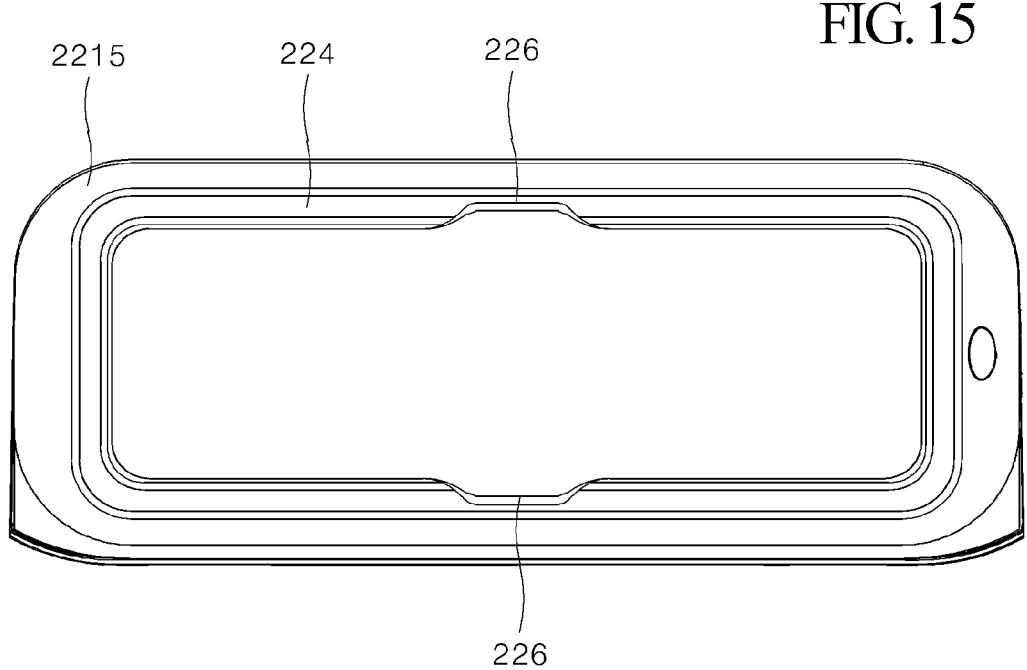
FIGS. 15 and 16 are plan views for explaining the configuration in which the cultivation water supply groove is provided in the water tank part.
Figure 16:
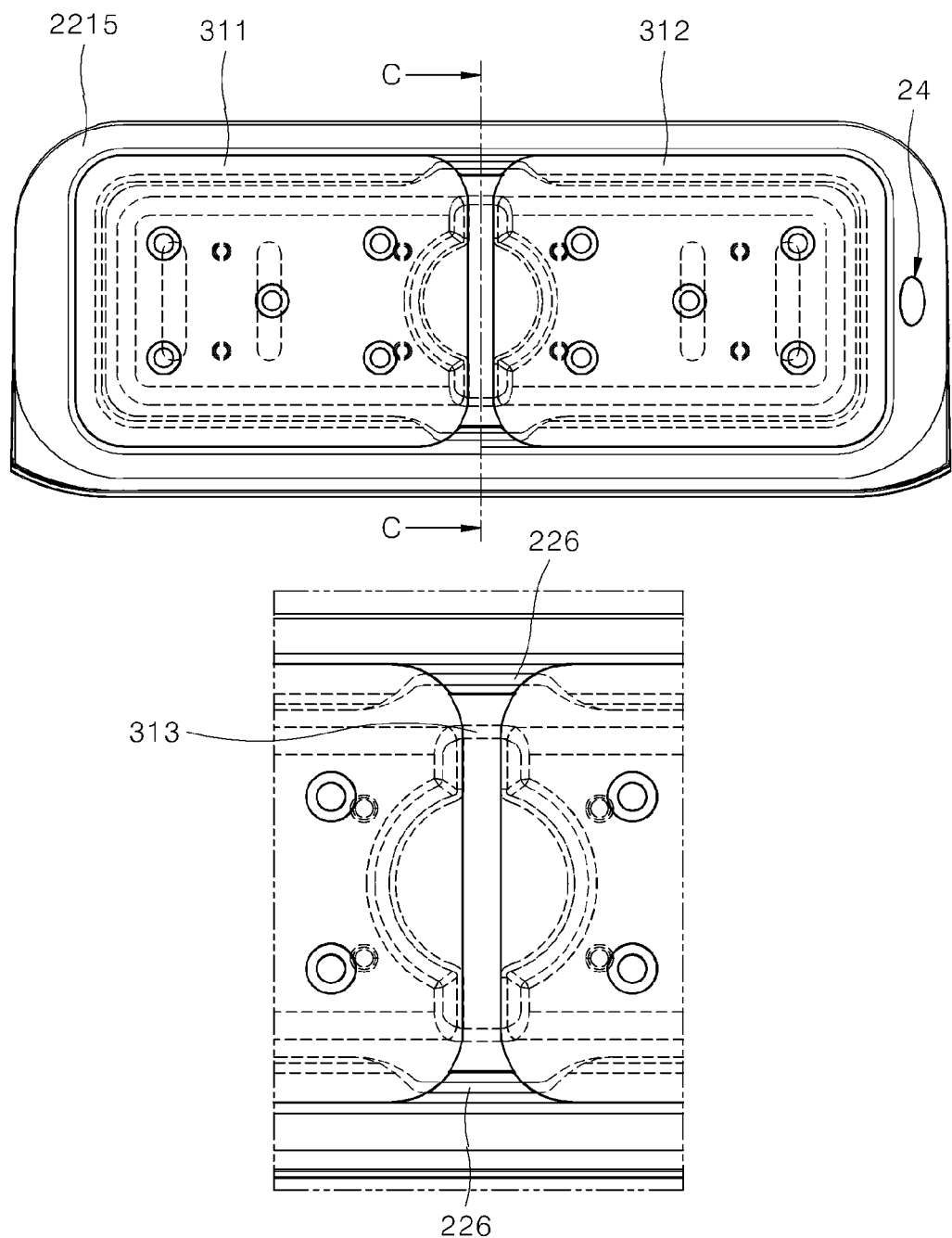
Figure 17:
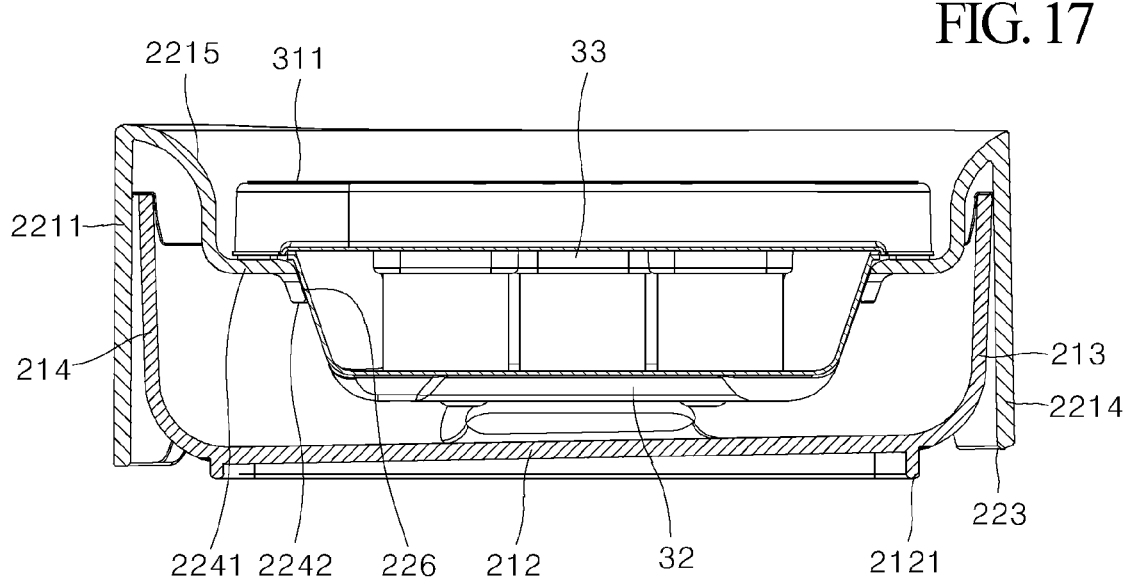
FIG. 17 is a cross-sectional view taken in the C-C direction of FIG. 16.

FIGS. 15 to 17 illustrate an embodiment in which the cultivation water supply grooves 226 are formed at two locations adjacent to the rear surface 2211 and the front surface 2214 of the water tank cover 22 on the center side in the left and right directions.

The present disclosure is not limited to this, but will be described based on an embodiment in which the cultivation water supply grooves 226 are formed in two locations.

These cultivation water supply grooves 226 are connected to the insertion hole 225 and are integrated with the insertion hole 225.

The cultivation water supply groove 226 is formed on the lower side of the connection part 313 of the port cover 31, which forms the minimum width in the front and rear direction among the port covers 31. Additionally, the width of the cultivation water supply groove 226 in the left and right direction may be larger than the width of the port cover 31 in the left and right direction.

Therefore, as illustrated in FIGS. 16 and 17, at least the inner end portion of the cultivation port supply groove 226 may be maintained in a state separated from or spaced apart from the port cover 31 and the port body 32.

Therefore, without separating the cultivation port part 30 from the water tank part 20, the user can replenish cultivation water into the inside of the water tank body 21 through the cultivation water supply groove 226, and through this, the convenience of the user can be improved.

However, as illustrated in FIG. 16, the maximum width between the cultivation water supply grooves 226 in the front and rear direction may be formed to be somewhat larger than the width of the connection part 313 of the port cover 31 in the front and rear direction.

In other words, the inside of the water tank body 21 may be slightly opened in the vertical direction at the position where the cultivation water supply grooves 226 are formed.

However, since this opening amount can be maintained at a fairly small level, the amount of light emitted from the light source part 60 directly transmitted into the inside of the water tank body 21 can be maintained to a minimum.

Figure 18:
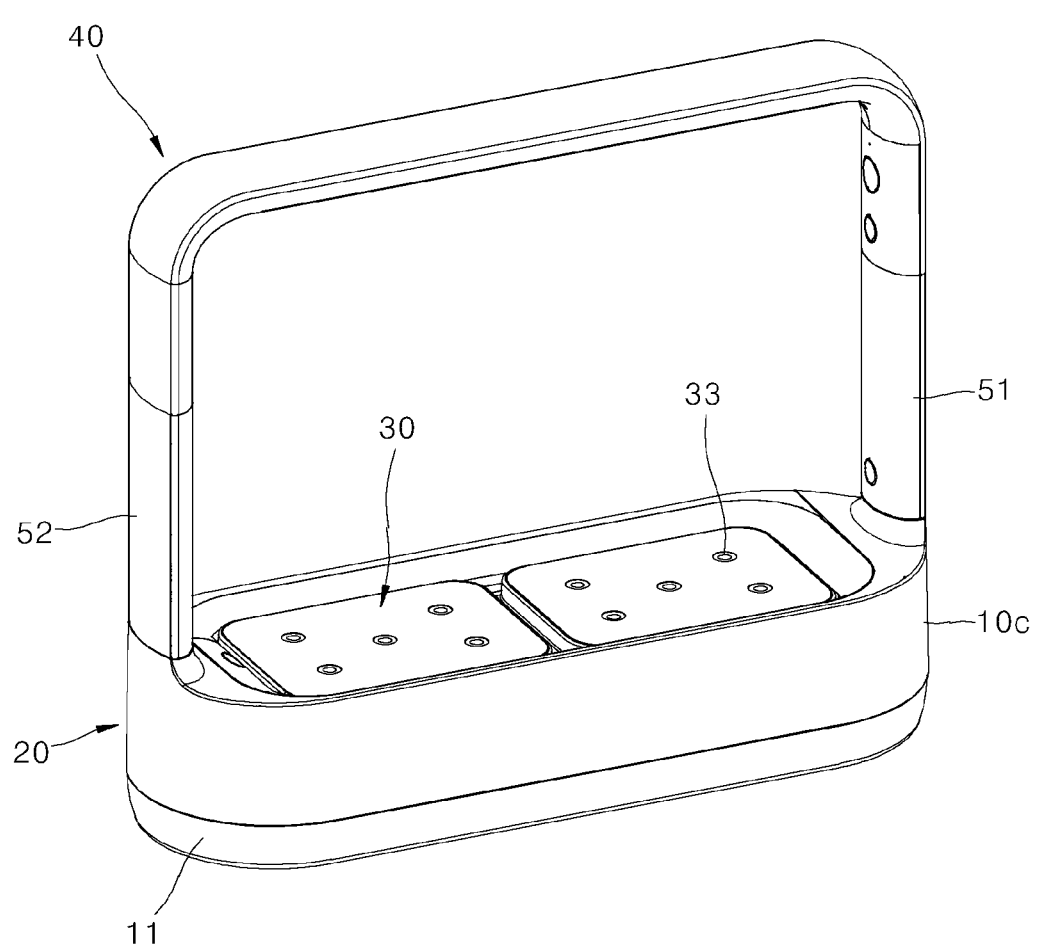
FIG. 18 is a front perspective view of a plant cultivator according to a second embodiment of the present disclosure.

Meanwhile, FIG. 18 illustrates the configuration of a plant cultivator according to a second embodiment of the present disclosure.

In the plant cultivator according to the second embodiment, unlike the first embodiment, the water tank part 20 may be formed to be integrated with the second main body 12.

In other words, the outer surface of the water tank cover 22 is configured to form the entire outer surface of the plant cultivator.

However, in the case of the second embodiment, as in the first embodiment, the water tank part 20 is maintained in a state of being supported by the first main body 11 and in a state of being simply mounted.

In other words, the user can easily separate the water tank part 20 from the first main body 11 by simply lifting the water tank part 20 upward.

As described above, the present disclosure has been described with reference to the illustrative drawings, but it is obvious that the present disclosure is not limited to the embodiments and drawings disclosed herein, and various modifications may be made by those skilled in the art within the scope of the technical idea of the present disclosure. In addition, it is natural that although the operational effects according to the configuration of the present disclosure were not explicitly described and explained while explaining the embodiments of the present disclosure above, the predictable effects due to the configuration should also be recognized.

Hereinafter, the configuration of the plant cultivator 1 according to the third embodiment of the present disclosure will be described with reference to FIGS. 9 to 28.

Figure 19:
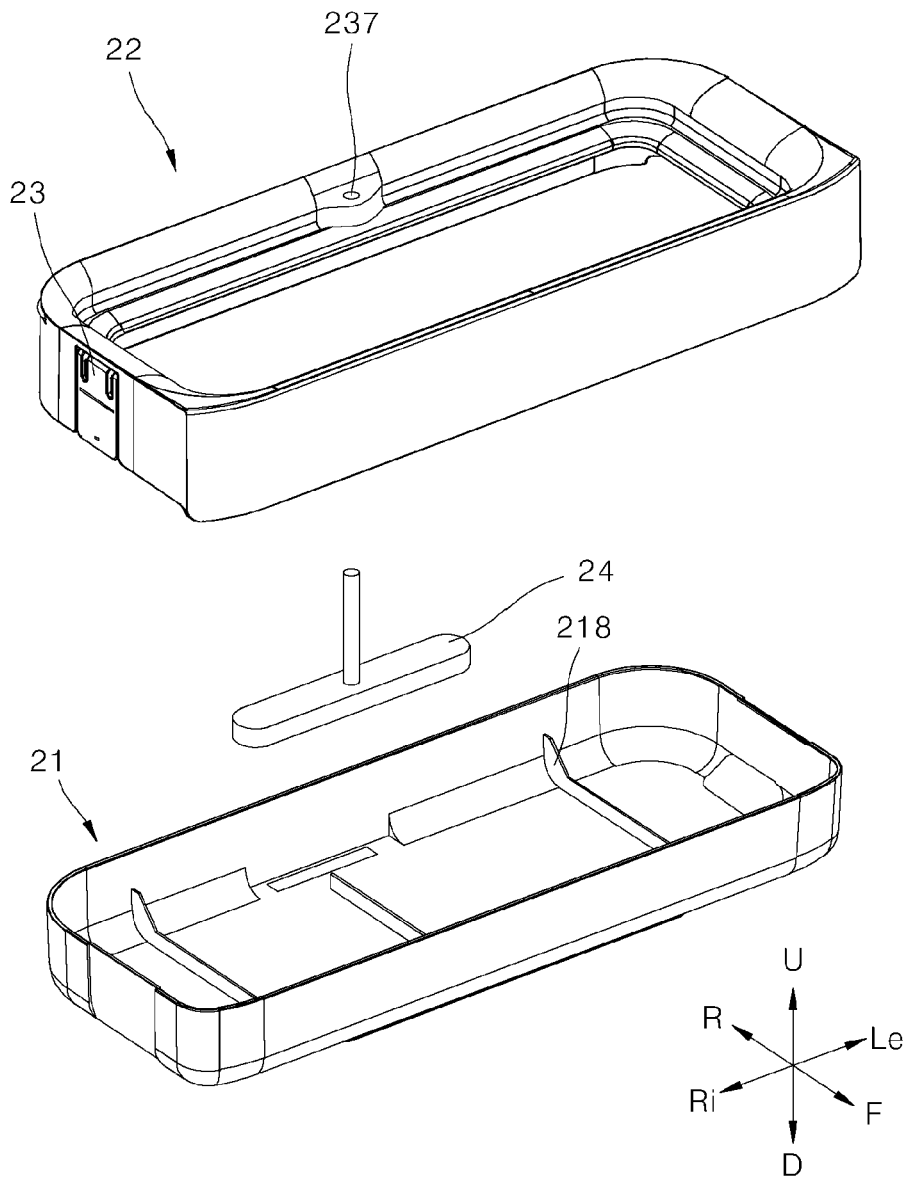
FIG. 19 is an exploded perspective view of the water tank part of the plant cultivator according to the third embodiment of the present disclosure.

FIG. 19 is an exploded perspective view of the water tank part 20 of the plant cultivator 1 according to the third embodiment of the present disclosure.

Referring to FIG. 19, the water tank part 20 may include a water tank body 21 that stores cultivation water supplied as a medium, a water tank cover 22 that covers the water tank body 21, and a water level display part 24 in the form of a buoy that displays the water level of the cultivation water stored in the water tank body 21. Although not illustrated, the water tank part 20 may further include a magnetic buoy for detecting the water level using an electronic sensor.

Unlike the first embodiment described above, the water level display part 24 may be formed in a horizontal long plate shape at the lower portion and a vertical bar shape at the upper portion. The upper portion of the water level display part 24 is disposed to penetrate the guide hole 227 of the water tank cover 22, so that the user can identify the height of the water level display part 24.

The water tank body 21 may be formed in the shape of a rectangular parallelepiped whose overall width in the left and right direction (Le-Ri direction) is greater than the width in the front and rear direction (F-R direction) and the upper surface is open. The bottom surface 212 of the water tank body 21 may be supported by surface contact with the upper surface of the main body part 10.

The water tank body 21 includes a partition wall 218 that protrudes upward from the bottom surface 212 of the water tank body 21 in the front and rear direction (F-R direction), that is, in the direction away from the bottom surface 212, and a body rib 219 that protrudes forward from the front surface and is in contact with the water tank cover 22.

Similar to the first embodiment, the water tank body 21 and the water tank cover 22 can be detachably coupled to each other through the fastening lever 23. The fastening lever 23 may have one end portion rotatably connected to either the water tank body 21 or the water tank cover 22, and the other end portion engaged to either the water tank body 21 or the water tank cover 22.

Figure 20:
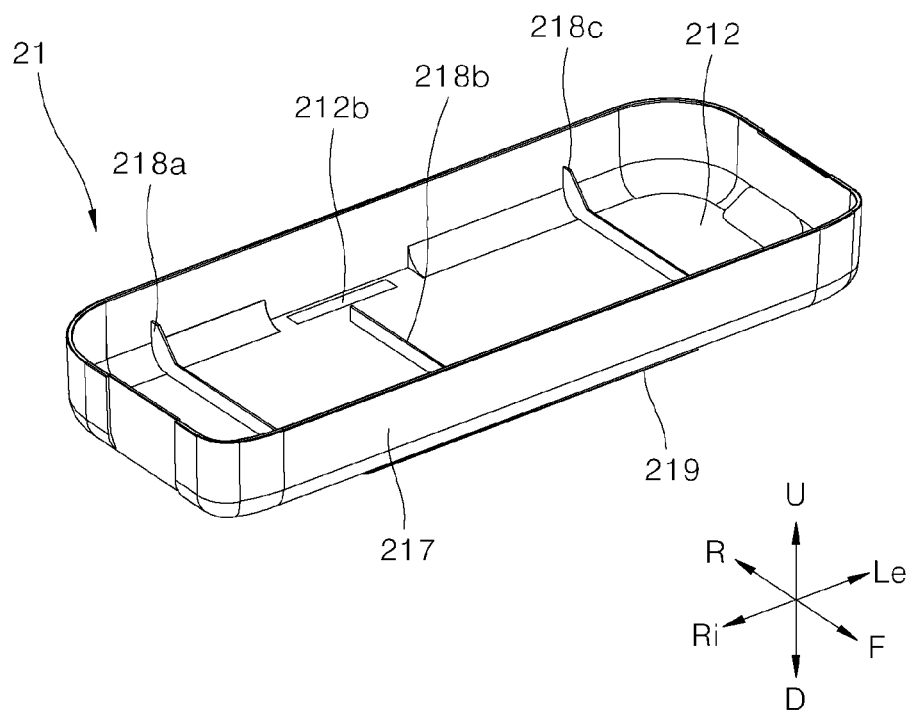
FIG. 20 is a plan perspective view of the water tank body of the plant cultivator illustrated in FIG. 19.
Figure 21:
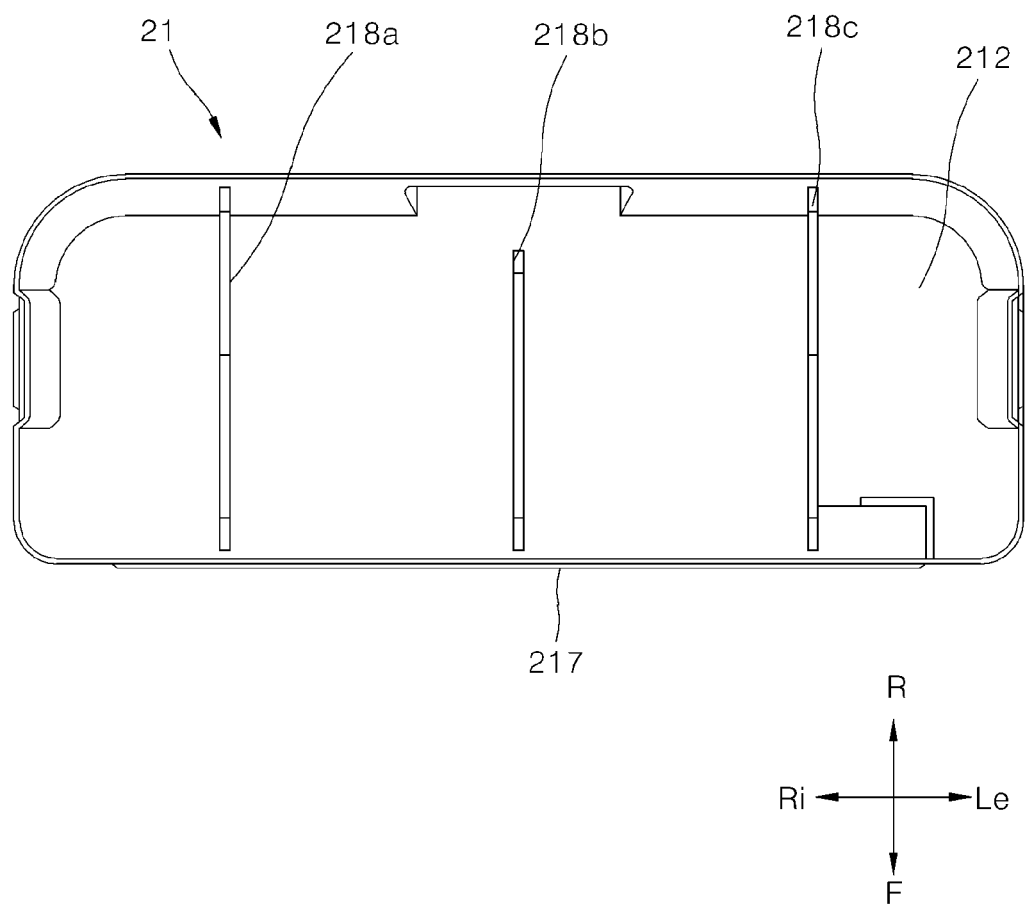
FIG. 21 is a plan view of the water tank body illustrated in FIG. 19.
Figure 22:
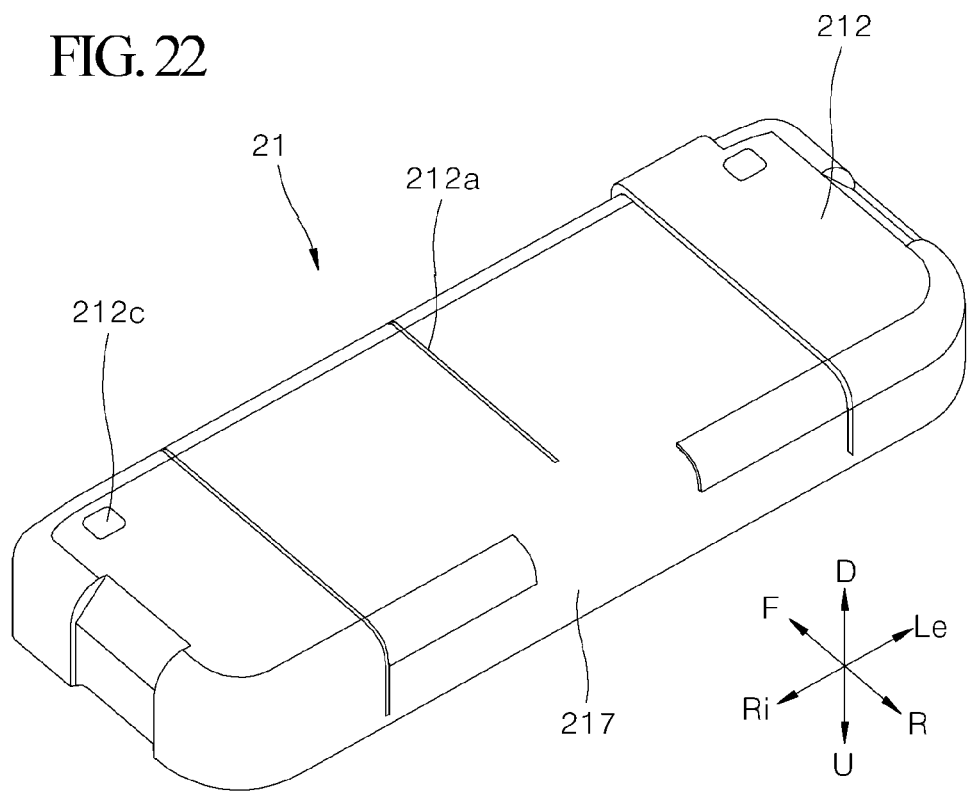
FIG. 22 is a bottom perspective view of the water tank body illustrated in FIG. 19.

FIG. 20 is a plan perspective view of the water tank body 21 of the plant cultivator 1 illustrated in FIG. 19, FIG. 21 is a plan view of the water tank body 21 illustrated in FIG. 19, and FIG. 22 is This is a bottom perspective view of the water tank body 21 illustrated in FIG. 19.

As illustrated, the water tank body 21 may include a bottom surface 212 that forms the bottom and has a substantially rectangular shape, and a water tank circumferential surface 217 that constitutes an outer wall surface formed upward from the circumference of the bottom surface 212.

At this time, the partition wall 218 may extend parallel to the short side of the rectangular bottom surface 212 with the short side direction (front and rear direction) as the longitudinal direction and may be formed to protrude upward from the bottom surface 212.

The partition wall 218 may be formed in a direction perpendicular to the longitudinal direction (left and right direction/Le-Ri direction) of the handle part 40 (front and rear direction/F-R direction) as the longitudinal direction. The partition wall 218 may be formed in a longitudinal direction perpendicular to the bar-shaped lighting of the handle part 40. Additionally, a plurality of partition walls 218 may be formed to be spaced apart from each other along the extending direction (left and right direction) of the long side of the bottom surface 212.

Since the width of the water tank body 21 in the left and right direction (Le-Ri direction) is longer than the width in the front and rear direction (F-R direction), when the cultivation water is concentrated in the left and right direction (Le-Ri direction), the movement width of the center of gravity becomes larger and thus the cultivation water easily becomes overwatered. Therefore, it is preferable that the partition wall 218 is formed along the front and rear direction (F-R direction) as the longitudinal direction to prevent the cultivation water from moving in the left and right direction (Le-Ri direction), and for this purpose, the cultivation water can be disposed spaced apart in the left and right direction (Le-Ri direction).

When a user moves the plant cultivator 1 by holding the handle part 40, the plant cultivator 1 may be tilted in the longitudinal direction of the handle part 40. Therefore, the partition wall 218 is preferably formed in a direction perpendicular to the longitudinal direction of the handle part 40 to prevent cultivation water from moving in the longitudinal direction of the handle part 40.

In this embodiment, for example, three partition walls 218 may be provided, and the first partition wall 218a, the second partition wall 218b, and the third partition wall 218c are spaced apart in the left and right direction (Le-Ri direction). The second partition wall 218b is disposed in the center of the bottom surface 212, the first partition wall 218a is disposed between the right side of the water tank circumference surface 217 and the second partition 218b, and the third partition wall 218c may be disposed between the left side of the water tank circumference surface 217 and the second partition 218b.

Meanwhile, it is preferable that the partition wall 218 gradually increases in height as it progresses from the middle portion in the longitudinal direction (front and rear direction) toward both ends. The partition wall 218 may be formed higher toward the portion in contact with the water tank circumference surface 217. Accordingly, the height at which the partition wall 218 protrudes from the bottom surface 212 may be formed to be highest at both ends.

Figure 26:
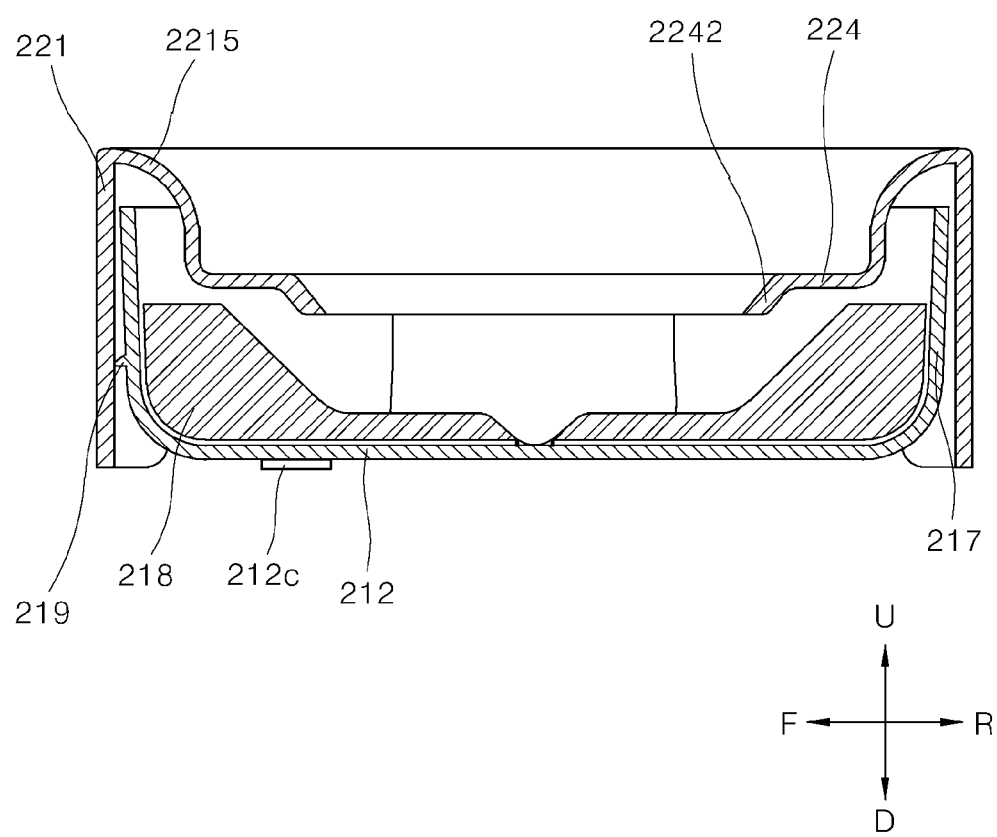
FIG. 26 is a partial cross-sectional view of the plant cultivator illustrated in FIG. 19.

Since the lower portion of the cultivation port part 30 has to be accommodated in the middle portion of the water tank body 21, the middle portion of the partition wall 218 may be formed low (see FIG. 26). In addition, if the cultivation water is concentrated on the edge of the water tank body 21, the cultivation water may rapidly pour out, so it is preferable that the portion of the partition wall 218 that is in contact with the water tank circumference surface 217 is formed high.

The bottom surface 212 may have a lower surface groove 212a formed on the lower side opposite to the upper side where the partition wall 218 protrudes and is drawn in toward the partition wall side (upper side) and extending along the partition wall 218. When the water tank body 21 is injected, since water tank body may shrink due to the partition wall 218, to prevent this, a lower surface groove 212a may be formed corresponding to the partition wall 218.

The partition wall 218 is not formed in the area 212b where the water level display part 24 is seated on the bottom surface 212. Since the water level display part 24 has to measure the water level, the water level display part has to be in contact with the bottom surface 212 when there is no cultivation water, so it is preferable that the partition wall 218 is not formed at the location where the water level display part 24 is to be seated. In this embodiment, the second partition 218b is formed in such a way that one end of the second partition wall 218b is cut off rather than extending to the water tank circumference surface 217 due to the water level display part 24.

A body rib 219 may be formed on the front surface of the water tank circumferential surface 217 of the water tank body 21. The body rib 219 protrudes from the front surface of the water tank circumferential surface 217 and is formed the left and right direction (Le-Ri direction) as the longitudinal direction. The water tank cover 22 covers the water tank circumference surface 217, and the front surface of the water tank cover 22 is directly exposed to the outside. Since the water tank cover 22 is formed by injection, the front surface may not be flat and may have a slight curve, and in this case, a sense of unity with the main body part 10 may not be created. The body rib 219 of the water tank circumferential surface 217 is disposed so that it contacts the rear of the front surface of the water tank cover 22 and pushes it forward when the water tank body 21 and the water tank cover 22 are combined. Accordingly, a sense of unity with the main body part 10 can be formed by preventing the front surface of the water tank cover 22 from being curved (see FIG. 26).

An engagement groove 212c is formed on the lower side of the bottom surface 212. A pair of engagement grooves 212c are formed and disposed forward on both left and right ends of the bottom surface 212. The engagement groove 212c is disposed between the water tank circumferential surface 217 and the lower surface groove 212a, avoiding the portion where the lower surface groove 212a is formed.

Figure 23:
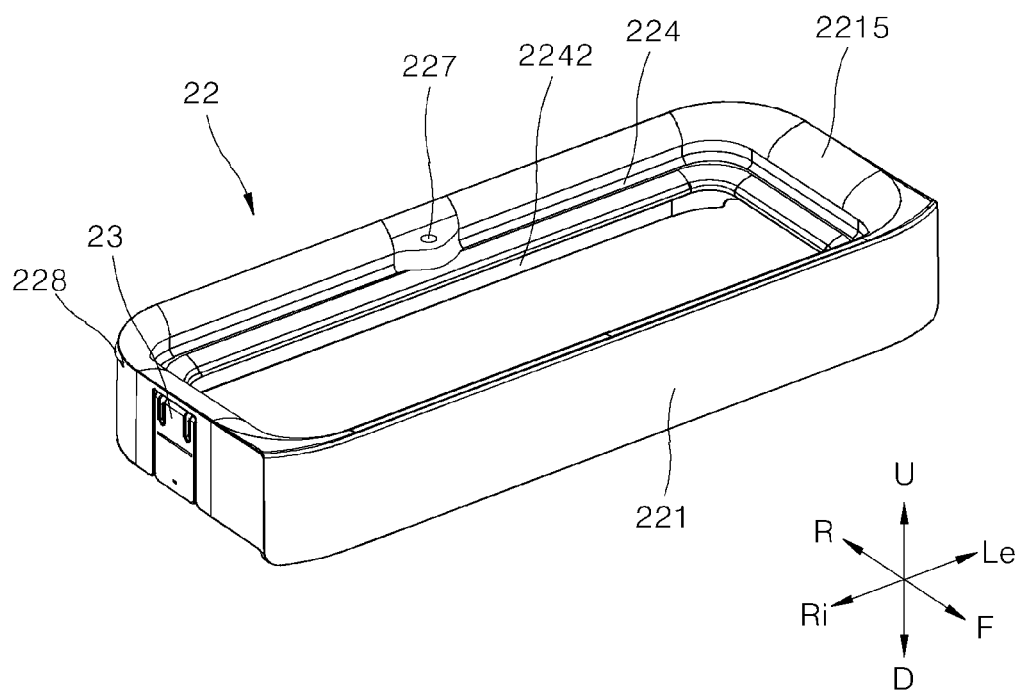
FIG. 23 is a perspective view of the water tank cover of the plant cultivator illustrated in FIG. 19.
Figure 24:
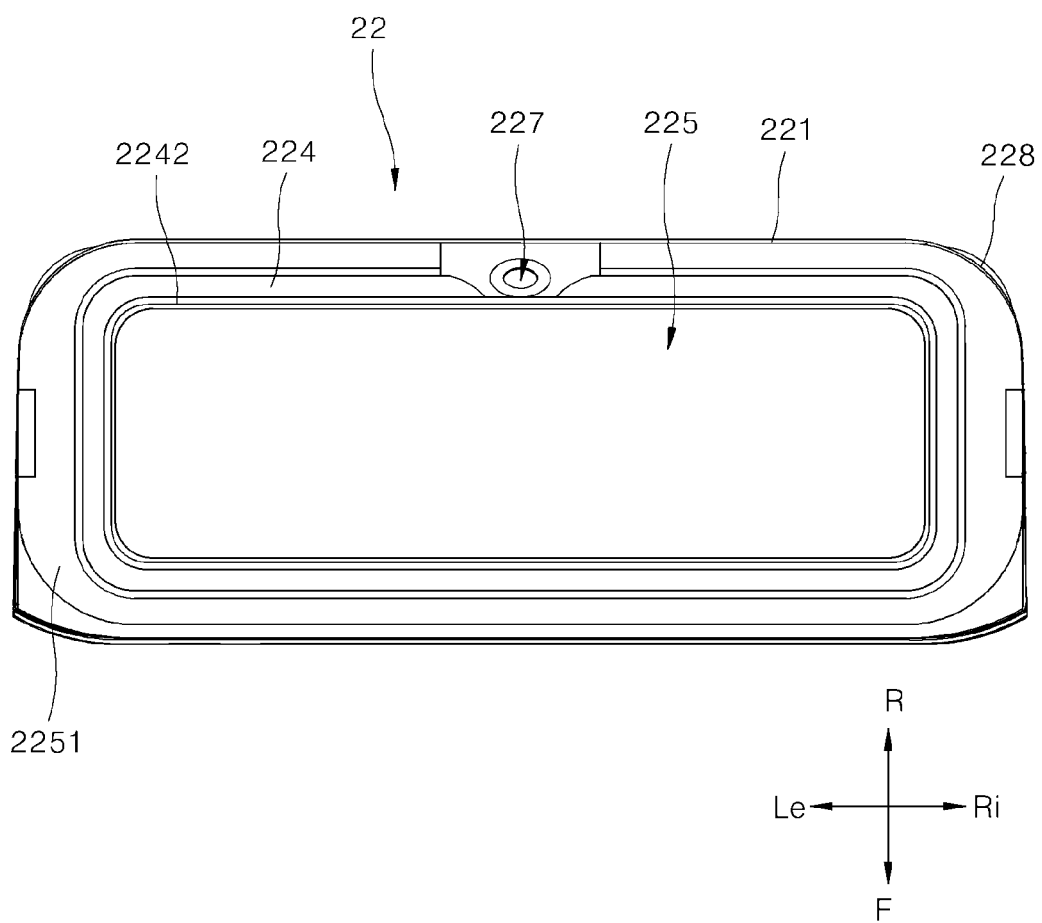
FIG. 24 is a rear view of the water tank cover illustrated in FIG. 22.
Figure 25:
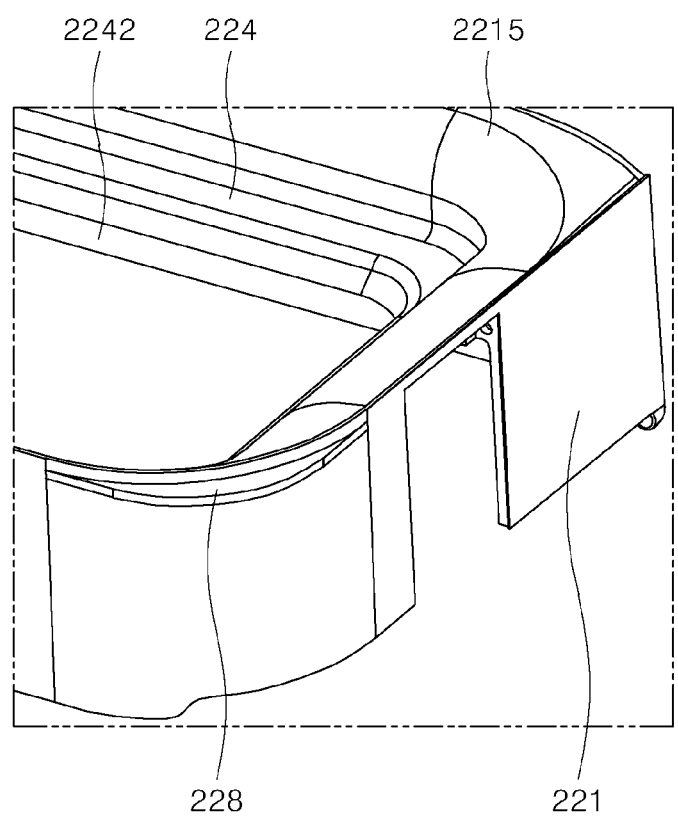
FIG. 25 is a partial perspective view of the water tank cover illustrated in FIG. 22.
Figure 27:
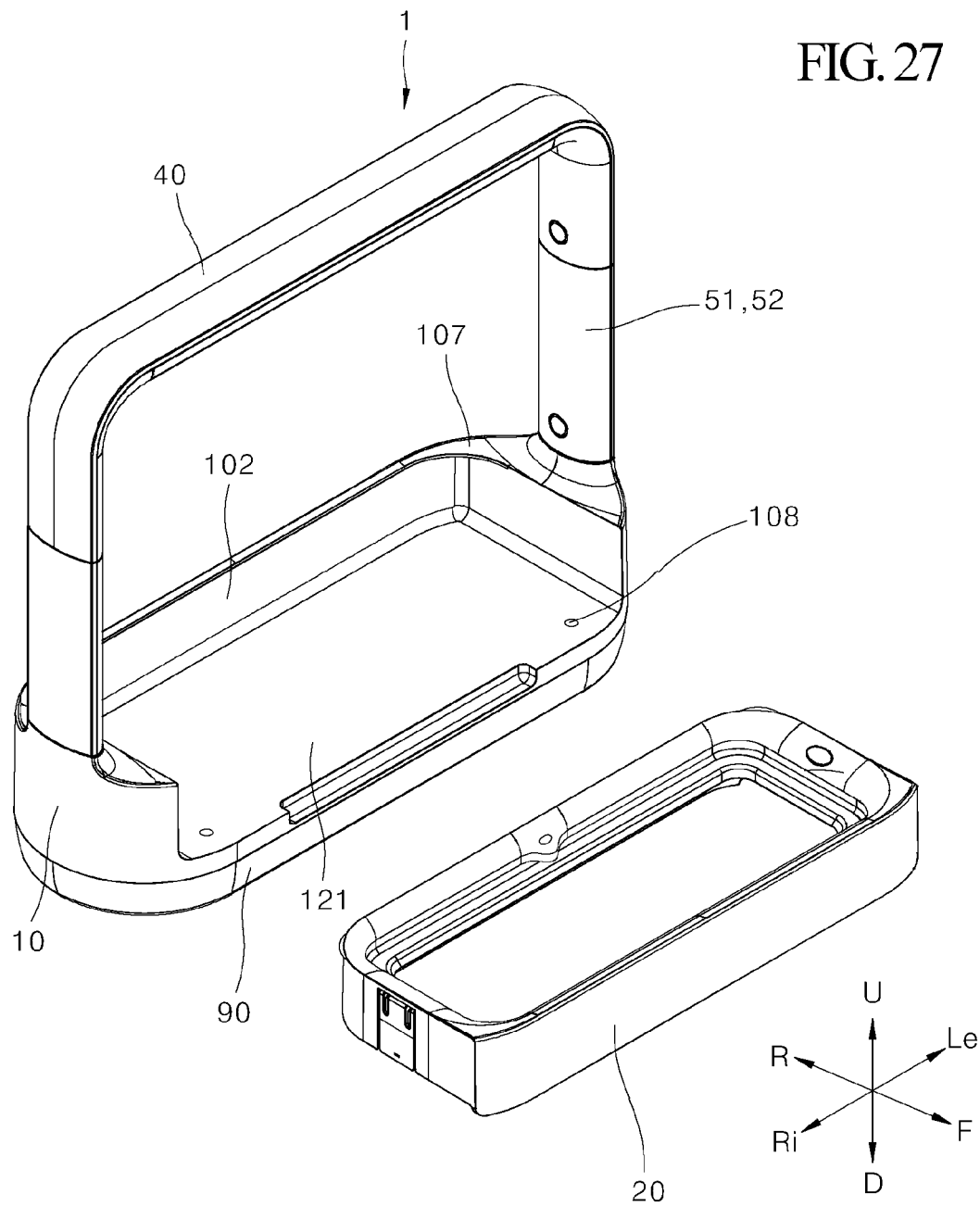
FIG. 27 is an exemplary diagram illustrating the use of a plant cultivator according to the third embodiment.
Figure 28:
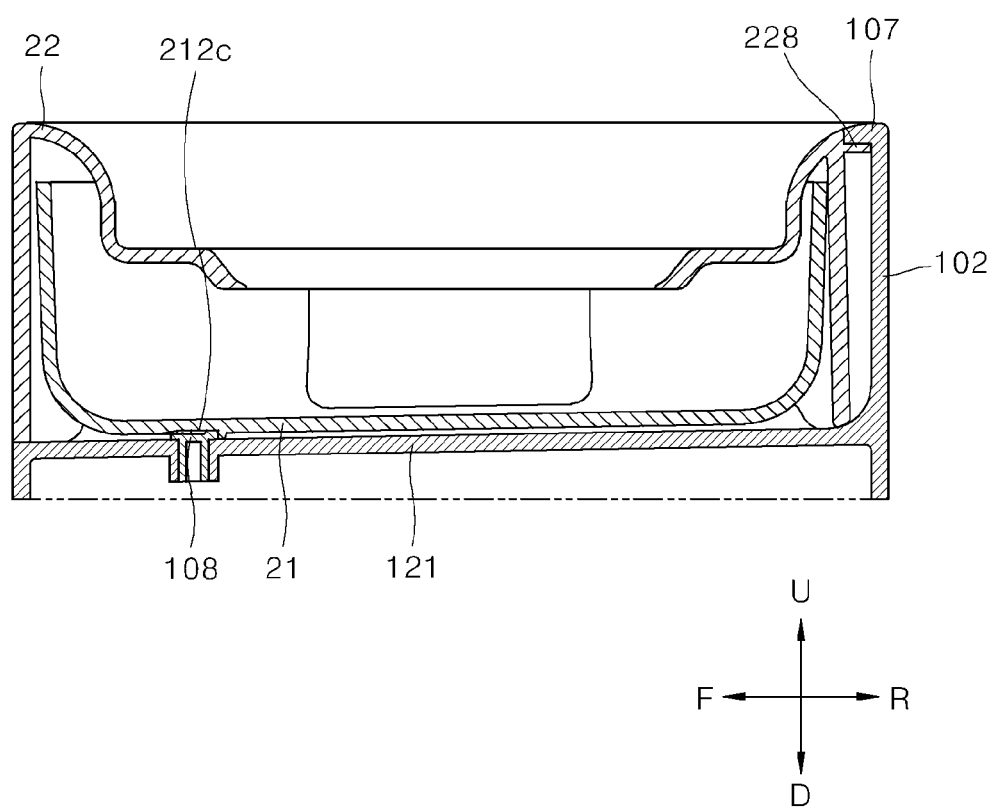
FIG. 28 is a partial cross-sectional view of the plant cultivator illustrated in FIG. 27.

FIG. 23 is a perspective view of the water tank cover 22 of the plant cultivator 1 illustrated in FIG. 19, FIG. 24 is a rear view of the water tank cover 22 illustrated in FIG. 22, FIG. 25 is a partial perspective view of the water tank cover 22 illustrated in FIG. 22, FIG. 26 is a partial cross-sectional view of the plant cultivator 1 illustrated in FIG. 19, FIG. 27 is an exemplary diagram illustrating the use of a plant cultivator 1 according to the third embodiment of the present disclosure, and FIG. 28 is a partial cross-sectional view of the plant cultivator 1 illustrated in FIG. 27.

The water tank cover 22 covers the water tank body 21 and forms the outer appearance of the top and circumference of the water tank part 20. The water tank cover 22 is shaped like a rectangular parallelepiped whose lower surface is entirely open and whose upper surface is partially open, with a width in the left and right direction (Le-Ri direction) that is larger than the width in the front and rear direction (F-R direction). The water tank cover 22 is formed with an insertion hole 225 into which the cultivation port part 30 is inserted. The water tank cover 22 may be formed to surround the upper end portion of the water tank circumference surface 217 of the water tank body 21 inside and out.

The water tank cover 22 may include an outer wall surface 221 forming an outer circumference, an expansion surface 2215 extending from the upper end of the outer wall surface 221 inward (to the center of the horizontal direction) and sloping downward, a mounting surface 224 extending horizontally inward from the lower end of the expansion surface 2215, and an inclined surface part 2242 extending from the inner end of the mounting surface 224 and is inclined downward.

The outer wall surface 221 is disposed on the outer circumference of the water tank circumference surface 217. The front surface of the outer wall surface 221 is exposed to the outside. A fastening lever 23 for fastening to the water tank body 21 may be disposed on both left and right sides of the outer wall surface 221.

The outer wall surface 221 may be provided with a cover rib 228 that protrudes outward along the horizontal direction at a corner or edge and is disposed at a lower position than the upper end of the outer wall surface 221. For example, the cover ribs 228 may be provided in pairs at the upper left and right corners or edges of the rear surface of the outer wall surface 221. The cover rib 228 is disposed slightly lower than the upper end of the outer wall surface 221.

The upper end of the outer wall surface 221 is connected to the upper end of the expansion surface 2215.

The expansion surface 2215 is disposed around the inner circumference of the upper end portion of the water tank circumference surface 217. The upper end of the expansion surface 2215 is disposed higher than the upper end of the water tank circumference surface 217, and the lower end of the expansion surface 2215 is positioned lower than the upper end of the water tank circumference surface 217. Referring to FIG. 26, the expansion surface 2215 is formed in a shape that covers a portion of the inner side from the upper end of the water tank circumferential surface 217, so that even if the cultivation water stored in the water tank body 21 exceeds the water tank circumference surface 217, the expansion surface can prevent overflow to the outside.

The expansion surface 2215 forms the upper outer appearance of the water tank part 20. A guide hole 227 is formed in the expansion surface 2215. The guide hole 227 is formed in the center of the rear side of the expansion surface 2215, and the portion of the expansion surface 2215 where the guide hole 227 is formed is preferably formed to be horizontal.

A portion of the expansion surface 2215 is disposed on the upper side of the partition wall 218. The lower end of the expansion surface 2215 is disposed higher than the uppermost end of the partition wall 218. The lower end of the expansion surface 2215 is connected to the outer end of the mounting surface 224.

The mounting surface 224 is formed horizontally so that a portion of the cultivation port part 30 is seated. The mounting surface 224 supports the cultivation port part 30 to mount the cultivation port part 30 so that the bottom surface of the cultivation port part 30 is not in contact with the water tank body 21.

The mounting surface 224 is disposed on the upper side of the partition wall 218. The inner end of the mounting surface 224 is connected to the upper end of the inclined surface part 2242.

The inclined surface part 2242 may be inclined downward to form the insertion hole 225. The cultivation port part 30 is inserted into the inclined surface part 2242, and a portion of the inclined surface part 2242 may be in contact with a portion of the cultivation port part 30. The lower end of the inclined surface part 2242 is disposed lower than the uppermost end of the partition wall 218.

Meanwhile, the main body part 10 of the plant cultivator 1 according to the third embodiment forms an upper outer appearance and may include a main body seating surface 121 that supports the bottom surface 212 of the water tank part 20 so that the water tank part 20 is seated. a main body circumferential surface 102 formed upward from a portion of the circumference of the main body seating surface 121 to form both sides and the rear surface and having the open front surface, and a stopper 108 protruding upward from the main body seating surface 121.

The main body circumferential surface 102 may be provided with a main body rib 107 at the upper end of the edge. The main body ribs 107 may be formed as a pair and disposed at the upper end of a corner or edge where both sides and the rear surface of the main body circumferential surface 102 are connected. The main body rib 107 may be in contact with the upper side of the cover rib 228 of the water tank part 20 when the water tank part 20 is seated on the main body part 10. When the water tank part 20 is seated on the main body part 10, the cover rib 228 is inserted below the main body rib 107 so that the water tank part 20 and the rear upper portion of the main body part 10 form a sense of unity and thus certainly there is no step between the water tank part 20 and the main body part 10.

In addition, when the user lifts the front of the water tank part 20 when separating the water tank part 20 from the main body part 10, the cover rib 228 is caught by the main body rib 107 and is naturally drawn forward.

Since the front of the body circumferential surface 102 is open, in order to form a sense of unity with the front surface of the outer wall surface 221, the body rib 219 may be formed on the portion of the water tank circumferential surface 217 where the main body circumferential surface 102 is open.

The main body portion 10 manufactured by plastic injection molding has a main body seating surface 121 inclined in the front and rear direction (F-R direction) in consideration of moldability. The front of the main body seating surface 121 is formed slightly lower than the rear. A stopper 108 is disposed on the main body seating surface 121 to prevent the water tank part 20 seated on the main body part 10 from sliding forward due to the gradient. The stopper 108 protrudes upward from the main body seating surface 121 and is caught in the engagement groove 212c of the bottom surface 212. The lower portion of the stopper 108 is fastened to the main body seating surface 121, and the upper portion is inserted into the engagement groove 212c.

When the user moves the plant cultivator 1 by holding the handle part 40, the stopper 108 prevents the water tank part 20 from moving in the horizontal direction. When the water tank part 20 moves in the horizontal direction, the cultivation water may overflow, so the stopper 108 limits the movement of the water tank part 20.

The stopper 108 is disposed in front of the main body seating surface 121 and supports the front of the water tank body 21 so that the water tank part 20 can be maintained horizontally. The stoppers 108 are provided in pairs and may be disposed biased forward on both left and right sides of the main body seating surface 121.

As described above, it is obvious that the present disclosure has been described with reference to the illustrative drawings, but the present disclosure is not limited to the embodiments and drawings disclosed herein, and various modifications may be made by those skilled in the art within the scope of the technical idea of the present disclosure. In addition, although the operational effects according to the configuration of the present disclosure were not explicitly described and explained while explaining the embodiments of the present disclosure above, it is natural that the predictable effects due to the configuration should also be recognized.

The invention claimed is:

1. A plant cultivator comprising:
a cultivation package;
a water tank on which the cultivation package is mounted and which stores cultivation water to be supplied to the cultivation package;
a main body on which the water tank is seated; and
a light source configured to emit light toward the cultivation package,
wherein the water tank is not fastened to the main body, and
wherein a guide rib is provided at a bottom surface of the water tank to determine a position at which the water tank is seated on the main body, and protrudes from the bottom surface of the water tank toward the main body.

2. The plant cultivator of claim 1,
wherein, in when the water tank is seated the main body, the guide rib allows movement of the water tank in an upward direction with respect to the main body and restricts movement of the water tank in a front and rear direction relative to the main body.

3. The plant cultivator of claim 1,
wherein the water tank includes:
a water tank body that has an upper opening and in which a storage space for the cultivation water is formed; and
wherein the guide rib protrudes from a bottom surface of the water tank body toward the main body.

4. The plant cultivator of claim 3,
wherein the guide rib is formed integrally with the bottom surface of the water tank body.

5. The plant cultivator of claim 3,
wherein a protruding height and a thickness from the bottom surface of the water tank body of the guide rib are constant throughout the guide rib.

6. The plant cultivator of claim 5,
wherein a width of the guide rib in the front and rear direction is less than a width of the guide rib in a left and right direction.

7. The plant cultivator of claim 3,
wherein the main body has an engaging groove into which the guide rib is inserted while the water tank is seated on the main body, and
wherein the engaging groove restricts movement of the guide rib relative to the main body in the front and rear direction.

8. The plant cultivator of claim 7, further comprising:
a housing disposed above the main body and configured to accommodate the light source; and
at least one spacer, each of the at least one spacer including a first end portion that is configured to be detachably coupled to the housing and a second end portion that is configured to be detachably coupled to the main body;
wherein a storage space is formed inside the engaging groove, and the storage space is configured to accommodate the at least one spacer when separated from the housing and the main body.

9. The plant cultivator of claim 1,
wherein the water tank includes:
a water tank body that has upper opening and in which a storage space for the cultivation water is formed; and
a water tank cover detachably coupled to the water tank body;
wherein the water tank cover includes a mounting surface configured to at least partially cover the upper opening of the water tank body when the water tank cover is coupled to the water tank body, and
wherein the cultivation package is seated on and not fastened to the mounting surface.

10. The plant cultivator of claim 9,
wherein the water tank body and the water tank cover are made of an opaque material.

11. The plant cultivator of claim 9,
wherein the mounting surface has an insertion hole which is toward the storage space of the water tank body and through which a lower end of the cultivation package passes when the cultivation package is seated on the mounting surface, and
wherein an area of the insertion hole is less than an area of the upper opening of the water tank body.

12. The plant cultivator of claim 11,
wherein the area of the insertion hole is less than a cross-sectional area of an upper end of the cultivation package.

13. The plant cultivator of claim 12,
wherein the insertion hole is covered by the upper end of the cultivation package when the cultivation package is seated on the mounting surface.

14. The plant cultivator of claim 13,
wherein the mounting surface has a cultivation water supply groove which is in communication with the insertion hole and is formed on below the upper end of the cultivation package.

15. The plant cultivator of claim 1,
wherein the cultivation package includes:
a package body that defines a space; and
a cultivation medium provided in the space of the package body.

16. The plant cultivator of claim 1,
wherein the main body includes a main body side wall and a main body base to define a receiving space to receive at least a portion of the water tank, and the main body side wall includes at least one inner surface facing the receiving space and that defines a side opening to the receiving space,
wherein the water tank includes a water tank side wall defining an inner cavity to receive the cultivation package and the cultivation water, and
wherein, when the water tank is seated on the main body, at least one interior surface included in a first region of the water tank side wall faces the at least one inner surface of the main body side wall, and a second region of the water tank side wall is positioned in the side opening of the main body.

17. The plant cultivator of claim 16,
wherein the main body base includes a storage space provided below the receiving space, and the main body includes an upper opening to access the receiving space, and
wherein a portion of the water tank is received in the upper opening of the main body when the water tank is seated on the main body.

18. A plant cultivator comprising:
a cultivation package;
a water tank on which the cultivation package is mounted and which stores cultivation water to be supplied to the cultivation package;
a main body including an upper surface to support the water tank; and
a light source positioned above the main body and the water tank to emit light toward the cultivation package,
wherein a bottom surface of the water tank includes a protrusion that protrudes from the bottom surface of the water tank toward the main body to determine a position at which the water tank is seated on the main body, and
wherein the upper surface of the main body includes a space to receive the protrusion of the water tank.

19. A plant cultivator comprising:
a base including a storage space and an upper opening to access the storage space;
a light that is coupled to the base; and
a tank that receives a cultivation medium and cultivation water,
wherein the tank includes a guide rib at a bottom surface of the tank to position the cultivation medium toward the light, and
wherein the guide rib protrudes from the bottom surface of the tank toward the base and is received within the upper opening of the base to couple the tank to the base.

* * * * *